United States Patent
O'Hare et al.

(10) Patent No.: US 9,738,816 B2
(45) Date of Patent: Aug. 22, 2017

(54) PRECISION COATING OF VISCOUS LIQUIDS AND USE IN FORMING LAMINATES

(71) Applicant: 3M INNOVATIVE PROPERTIES COMPANY, St. Paul, MN (US)

(72) Inventors: Jonathan J. O'Hare, Oakdale, MN (US); Karl K. Stensvad, Inver Grove Heights, MN (US); Christopher J. Campbell, Burnsville, MN (US); Daniel H. Carlson, Arden Hills, MN (US); Glen A. Jerry, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 44 days.

(21) Appl. No.: 14/442,131

(22) PCT Filed: Dec. 2, 2013

(86) PCT No.: PCT/US2013/072582
§ 371 (c)(1),
(2) Date: May 12, 2015

(87) PCT Pub. No.: WO2014/088936
PCT Pub. Date: Jun. 12, 2014

(65) Prior Publication Data
US 2016/0289502 A1    Oct. 6, 2016

Related U.S. Application Data

(60) Provisional application No. 61/734,221, filed on Dec. 6, 2012.

(51) Int. Cl.
*C09J 5/00* (2006.01)
*G02F 1/13* (2006.01)
(Continued)

(52) U.S. Cl.
CPC ............... *C09J 5/00* (2013.01); *B05D 1/02* (2013.01); *C03C 17/002* (2013.01);
(Continued)

(58) Field of Classification Search
None
See application file for complete search history.

(56) References Cited

U.S. PATENT DOCUMENTS

| 4,938,994 A | 7/1990 | Choinski |
| 5,536,313 A | 7/1996 | Watanabe |

(Continued)

FOREIGN PATENT DOCUMENTS

| WO | WO 2008-157588 | 12/2008 |
| WO | WO 2008-157619 | 12/2008 |

(Continued)

OTHER PUBLICATIONS

Gutoff, "Coating and Drying Defects: Troubleshooting Operating Problems"; John Wiley & Sons, Inc.; 2006; $2^{nd}$ Edition, pp. 131-137.

(Continued)

*Primary Examiner* — Nathan T Leong

(57) ABSTRACT

A process including providing a coating head having an external opening in flow communication with a source of a first coating liquid, positioning the coating head relative to a substrate to define a gap between the external opening and the substrate, creating relative motion between the coating head and the substrate in a coating direction, and dispensing a predetermined quantity of the first coating liquid from the external opening onto at least a portion of at least one major surface of the substrate to form a discrete patch of the first coating liquid in a predetermined position on at least a portion of the major surface of the substrate. The first coating liquid as dispensed exhibits a viscosity of at least 1

(Continued)

Pascal-sec. In some exemplary embodiments, the first coating liquid is a liquid optically clear adhesive composition used in a laminate including a light emitting or reflecting device component.

19 Claims, 7 Drawing Sheets

(51) Int. Cl.
*C03C 17/00* (2006.01)
*B05D 1/02* (2006.01)
*C09J 133/10* (2006.01)
*G02F 1/1333* (2006.01)
*B29D 11/00* (2006.01)

(52) U.S. Cl.
CPC .......... *C09J 133/10* (2013.01); *G02F 1/1303* (2013.01); *G02F 1/13338* (2013.01); *B29D 11/0073* (2013.01); *G02F 2202/28* (2013.01)

(56) References Cited

U.S. PATENT DOCUMENTS

| | | | |
|---|---|---|---|
| 5,867,241 A | 2/1999 | Sampica | |
| 5,911,831 A | 6/1999 | Behringer | |
| 6,388,724 B1 * | 5/2002 | Campbell | G02F 1/133502 349/122 |
| 6,540,833 B1 | 4/2003 | Gibson | |
| 6,641,671 B2 | 11/2003 | Shinozaki | |
| 6,725,769 B1 | 4/2004 | Williams | |
| 7,105,203 B1 | 9/2006 | Masuda | |
| 7,344,665 B2 | 3/2008 | Pekurovsky | |
| 7,416,608 B2 | 8/2008 | Liu | |
| 7,449,069 B2 | 11/2008 | Kwon | |
| 7,524,377 B2 | 4/2009 | Pekurovsky | |
| 7,685,693 B2 | 3/2010 | Pekurovsky | |
| 8,405,831 B2 | 3/2013 | Carlson | |
| 2007/0191506 A1 | 8/2007 | Lu | |
| 2009/0215351 A1 | 8/2009 | Kobayashi | |
| 2009/0270576 A1 | 10/2009 | Hunt | |
| 2010/0188668 A1 | 7/2010 | Carlson | |
| 2010/0196607 A1 | 8/2010 | Carlson | |
| 2011/0247511 A1 | 10/2011 | Carlson | |
| 2011/0257779 A1 | 10/2011 | Theis | |
| 2012/0115976 A1 | 5/2012 | Igarashi | |
| 2013/0196163 A1 | 8/2013 | Swanson | |

FOREIGN PATENT DOCUMENTS

| | | |
|---|---|---|
| WO | WO 2010-011316 | 1/2010 |
| WO | WO 2010-077592 | 7/2010 |
| WO | WO 2010-077719 | 7/2010 |
| WO | WO 2010-111316 | 9/2010 |
| WO | WO 2011-087983 | 7/2011 |
| WO | WO 2011-119828 | 9/2011 |
| WO | WO 2012-036980 | 3/2012 |
| WO | WO 2012-071303 | 5/2012 |
| WO | WO 2013-049133 | 4/2013 |
| WO | WO 2013-181030 | 12/2013 |
| WO | WO 2014-088939 | 6/2014 |

OTHER PUBLICATIONS

International Search Report for PCT International Application No. PCT/US2013/072582 mailed on Mar. 19, 2014, 4 pages.

* cited by examiner

PRECISION COATING OF VISCOUS LIQUIDS AND USE IN FORMING LAMINATES

CROSS REFERENCE TO RELATED APPLICATIONS

This application claims the benefit of U.S. Provisional Application No. 61/734,221, filed Dec. 6, 2012, the disclosure of which is incorporated by reference herein in its entirety.

TECHNICAL FIELD

The present disclosure relates generally to the application of coatings to substrates, and more particularly to the precise coating onto substrates of viscous liquid adhesives that do not self-level, and forming laminates from such coated substrates.

BACKGROUND

Liquid optically clear adhesives (LOCA) are becoming more prevalent in the display industry to fill the air gap between the optical elements. For example, LOCAs can fill the air gap between a cover glass and indium tin oxide (ITO) touch sensors, between ITO touch sensors and a liquid crystal module, or directly between the cover glass and the liquid crystal module. Recently, several coating processes have been developed for more precisely coating patches of low to moderate viscosity, self-leveling liquids, such as liquid optically clear adhesives (LOCA), onto substrates.

One known process for applying LOCA patches to a substrate makes use of flowable liquid OCAs that behave like low viscosity Newtonian liquids at the application conditions. To prevent flow beyond the desired printing area due to self-leveling of these liquids, the use of a pre-cured dam material (matching the refractive index of the LOCA) is often required. This involves an additional process step, and may still potentially lead to overflow of the LOCA if a sufficiently precise amount is not dispensed and/or there is not perfect co-planarity between the two substrates that are being bonded with the LOCA.

The use of a screen for precise printing LOCA patches has also been described, for example in Kobayashi et al. (U.S. Patent Application Pub. No. 2009/0215351). Additionally, the use of a stencil for precise printing of LOCA patches has been described in PCT International Pub. No. WO 2012/036980. Regardless of whether a screen or a stencil is used, self-leveling of the low to moderate viscosity LOCA may degrade the desired positional accuracy of the LOCA patch placement on the substrate. Nevertheless, such adhesives and processes have been found useful in forming optical assemblies for producing display panels used in a variety of electronic devices.

SUMMARY

In one aspect, the present disclosure describes a process including providing a coating head having an external opening in flow communication with a source of a first coating liquid, positioning the coating head relative to a substrate to define a gap between the external opening and the substrate, creating relative motion between the coating head and the substrate in a coating direction, and dispensing a pre-determined quantity of the first coating liquid from the external opening onto at least a portion of at least one major surface of the substrate to form a discrete patch of the first coating liquid in a predetermined position on at least a portion of the major surface of the substrate. The patch has a thickness and a perimeter. The first coating liquid as dispensed exhibits a viscosity of at least 1 Pascal-sec. The first coating liquid can be a liquid optically clear adhesive (LOCA) composition. It is presently preferred that a screen or stencil is not used to form the discrete patch.

LISTING OF EXEMPLARY EMBODIMENTS

In some exemplary embodiments of the foregoing coating processes, the first coating liquid is dispensed at a shear rate of at least about 1 $\sec^{-1}$. In other exemplary embodiments, the first coating liquid is dispensed at a shear rate of at least about 10, about 50, about 100, about 1000, and about 10000 $\sec^{-1}$. Optionally, the first coating liquid is dispensed at a shear rate no greater than about 100,000 $\sec^{-1}$. In certain exemplary embodiments, the first coating liquid is dispensed at a temperature from about 20° C. to about 100° C. In some such exemplary embodiments, the first coating liquid as dispensed exhibits a viscosity from about 2 Pascal-sec to about 20 Pascal-sec.

In further exemplary embodiments of any of the foregoing coating processes, the first coating liquid exhibits at least one distinguishing rheological characteristic selected from thixotropic rheological behavior and pseudoplastic rheological behavior. In certain exemplary embodiments, the first coating liquid exhibits a Thixotropic Index, defined as the ratio of the low shear viscosity measured at a shear rate of 0.1 $\sec^{-1}$ to the high shear viscosity measured at 100 $\sec^{-1}$, of at least 5. In some exemplary embodiments, the first coating liquid exhibits an Equilibrium Viscosity measured on a coating liquid in a fully relaxed state at a shear rate of 1 $\sec^{-1}$ sufficiently high to prevent self-leveling of the coating liquid on the substrate. Optionally, the Equilibrium Viscosity measured at a shear rate of 0.01 $\sec^{-1}$ is at least 80 Pa-sec.

In additional exemplary embodiments of any of the foregoing coating processes, the first coating liquid is a liquid optically clear adhesive composition. In some such embodiments, the liquid optically clear adhesive composition includes a reaction product of a multifunctional (meth)acrylate oligomer and a reactive diluent including a monofunctional (meth)acrylate monomer having a viscosity of from 0.004 to 0.020 Pascal-sec measured at a shear rate of 1 $\sec^{-1}$ and a temperature of 25° C., and at least one of a plasticizer or a monofunctional (meth)acrylate monomer having alkylene oxide functionality. In certain exemplary embodiments of any of the foregoing coating processes, the multifunctional (meth)acrylate oligomer includes any one or more of a multifunctional urethane (meth)acrylate oligomer, a multifunctional polyester (meth)acrylate oligomer, and a multifunctional polyether (meth)acrylate oligomer.

In other exemplary embodiments of any of the foregoing coating processes, the liquid optically clear adhesive composition includes a reaction product of a multifunctional rubber-based (meth)acrylate oligomer and a monofunctional (meth)acrylate monomer having a pendant alkyl group of from about 4 to 20 carbon atoms, and a liquid rubber. In certain such exemplary embodiments, the multifunctional rubber-based (meth)acrylate oligomer comprises any one or more of a multifunctional polybutadiene (meth)acrylate oligomer, a multifunctional isoprene (meth)acrylate oligomer, and a multifunctional (meth)acrylate oligomer including a copolymer of butadiene and isoprene. Optionally, the liquid rubber includes liquid isoprene.

In further exemplary embodiments of any of the foregoing coating processes, the liquid optically clear adhesive composition is a curable composition including (a) a (meth) acryolyl oligomer having a $M_w$ of 5 to 30 kDa and a $T_g$ of less than 20° C. including: (i.) greater than 50 parts by weight of (meth)acrylate ester monomer units, (ii.) 10 to 49 parts by weight of hydroxyl-functional monomer units, (iii.) 1 to 10 parts by weight of monomer units having pendent (meth)acrylate groups, (iv.) 0 to 20 parts by weight of polar monomer units, (v.) 0 to 10 parts by weight of silane-functional monomer units, wherein the sum of the monomer units is 100 parts by weight; (b) a diluent monomer component; and (c) a photoinitiator. The curable composition preferably includes no cross-linking agents. In certain such embodiments, the diluent monomer component comprises at least one monomer selected from (meth)acrylate ester monomer units, hydroxyl-functional monomer units; monomer units having pendent (meth)acrylate groups, polar monomer units, and silane-functional monomer units.

In any of the foregoing exemplary coating processes, the liquid optically clear adhesive composition further includes at least one additive selected from heat stabilizers, antioxidants, antistatic agents, thickeners, fillers, pigments, dyes, colorants, thixotropic agents, processing aids, nanoparticles, and fibers. In certain such embodiments, the additive is present in an amount of 0.01 to 10 wt. % relative to the mass of the liquid optically clear adhesive composition. In some such exemplary embodiments, the liquid optically clear adhesive composition further includes metal oxide nanoparticles having a median particle diameter of 1 nm to about 100 nm in an amount of 1 to 10 wt. %, relative to the total weight of the liquid optically clear adhesive composition.

In any of the foregoing exemplary embodiments coating processes, the patch covers only a portion of a first major surface of the substrate. In some exemplary embodiments of any of the foregoing coating processes, the perimeter exhibits a geometric shape selected from a square, a rectangle, or a parallelogram. In certain exemplary embodiments of any of the foregoing coating processes, the predetermined position is selected such that the perimeter of the patch has a center proximate a center of the major surface of the substrate.

In further exemplary embodiments of any of the foregoing coating processes, the thickness of the patch is non-uniform. In some such embodiments, the thickness of the patch is greater proximate the center of the patch, and the thickness of the patch is lower proximate the perimeter of the patch. In certain embodiments, the patch includes at least one raised discrete protrusion extending outwardly from the major surface of the substrate. In further such exemplary embodiments, the at least one raised discrete protrusion is comprised of at least one raised rib extending across at least a portion of the major surface of the substrate. In some such embodiments, the at least one raised rib includes at least two raised ribs arranged cross-wise on the major surface of the substrate. In certain such embodiments, the at least two ribs intersect and overlap proximate the center of the perimeter of the patch.

In other exemplary embodiments coating processes, the at least one raised discrete protrusion is a multiplicity of raised discrete protrusions. In some such exemplary embodiments, the multiplicity of raised discrete protrusions is selected from a plurality of raised discrete bumps, a multiplicity of raised discrete ribs, or a combination thereof. In certain such embodiments, the multiplicity of raised discrete bumps is comprised of hemispherically-shaped bumps. Optionally, the multiplicity of raised discrete bumps is arranged in an array pattern. In some particular embodiments, the multiplicity of raised discrete ribs form a dogbone-shaped pattern.

In other exemplary embodiments of any of the foregoing coating processes, the multiplicity of raised discrete ribs is comprised of elliptically-shaped ribs. In some such embodiments, the multiplicity of raised discrete ribs is arranged such that each rib is arranged substantially parallel to each adjoining rib. In certain such embodiments, at least two of the multiplicity of raised discrete ribs are arranged substantially parallel to each other, and at least one of the multiplicity of raised discrete ribs is arranged substantially orthogonal to the at least two substantially parallel raised discrete ribs.

In alternative exemplary embodiments to those described in the preceding two paragraphs, the thickness of the patch is substantially uniform. Optionally, a mean thickness of the patch is from about 1 µm to about 500 µm. In some such exemplary embodiments, the thickness of the patch has a uniformity of +/−10% of the mean thickness or better.

In further exemplary embodiments of any of the foregoing coating processes, the perimeter of the patch is defined by a plurality of lateral edges of the patch. In some such embodiments, at least one lateral edge of the patch is positioned relative to an edge of the substrate to within +/−500 µm of a target position.

In additional exemplary embodiments of any of the foregoing coating processes, the substrate is a light emitting display component or a light reflecting device component. In some exemplary embodiments, the substrate is substantially transparent. In certain exemplary embodiments, the substrate is comprised of glass. In some particular embodiments, the substrate is flexible.

In additional exemplary embodiments of any of the foregoing coating processes, the coating head is selected from the group consisting of a single slot die, a multiple slot die, a single orifice die, and a multiple orifice die. In certain such embodiments, the coating head is a single slot die having a single die slot, further wherein the external opening is comprised of the die slot. In some particular such embodiments, the geometry of the single slot die is selected from a sharp-lipped extrusion slot die, a slot fed knife die with a land, or a notched slot die.

In any of the foregoing exemplary embodiments of coating processes, the source of the first coating liquid comprises a pre-metered coating liquid delivery system selected from a syringe pump, a dosing pump, a gear pump, a servo-driven positive displacement pump, a rod-driven positive displacement pump, or a combination thereof.

In some particular exemplary embodiments of the foregoing coating processes, at least one pressure sensor communicating with the source of the first coating liquid is used to measure a delivery pressure of the first coating liquid. The delivery pressure is used to control at least one of the delivery rate of the first coating liquid to the substrate, or a quality characteristic of the patch. Suitable quality characteristics include the thickness uniformity of the patch, the positional accuracy and/or precision of the patch position on the substrate relative to a target position (as described further below), the uniformity of the patch perimeter (e.g., the "squareness" of a patch having a square-shaped perimeter), the straightness of an edge of the patch, the absence of coating defects (e.g., bubbles, voids, entrained foreign matter, surface irregularities, and the like), the quantity (e.g., by weight or volume) of the first coating liquid forming the patch, and the like.

In further exemplary embodiments, the coating process includes repeating the steps of paragraph [0006] using a second coating liquid. In certain such exemplary embodiments, a second coating liquid different from the first coating liquid is used. In other such exemplary embodiments, a second coating liquid which is the same as the first coating liquid is used. In any of the foregoing exemplary embodiments, the second coating liquid can overlay at least a portion of the first coating liquid.

In additional further exemplary embodiments of any of the foregoing processes, the process further includes disposing a second substrate relative to the first substrate such that the patch is positioned between the first and second substrates, wherein the patch contacts at least a portion of each of the first and second substrates, thereby forming a laminate. In some such embodiments, the process further includes curing the coating liquid by applying heat, actinic radiation, ionizing radiation, or a combination thereof. In some particular exemplary embodiments, the laminate includes an organic light-emitting diode display, an organic light-emitting transistor display, a liquid crystal display, a plasma display, a surface-conduction electron-emitter display, a field emission display, a quantum dot display, a liquid crystal display, a micro-electromechanical system display, a ferro liquid display, a thick-film dielectric electroluminescent display, a telescopic pixel display, or a laser phosphor display.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

Figure 1:
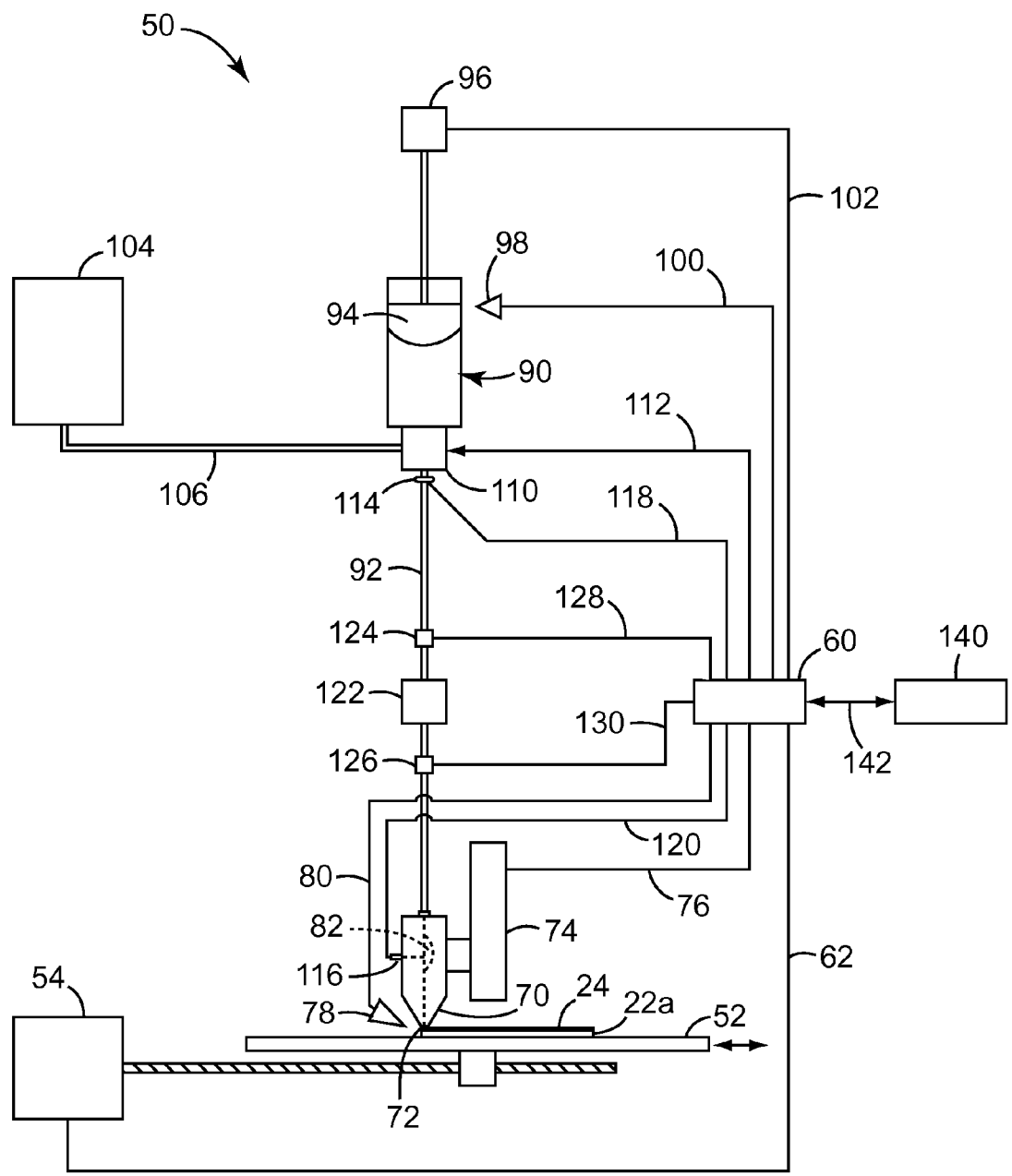
FIG. 1 is a schematic view of an exemplary coating apparatus.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this invention.

DETAILED DESCRIPTION

Recently, a liquid optically clear adhesive (LOCA) composition was disclosed in PCT International Pub. No. WO 2011/119828. An example of coating a patch of this LOCA composition onto a display substrate using a stencil to determine the perimeter of the patch was disclosed in PCT International Pub. No. WO 2012/036980. In addition to the positional accuracy and throughput limitations imposed by use of a stencil, it is usually necessary to provide for prompt, in-line vacuum lamination of the LOCA-coated substrate in order to prevent the entrapment of bubbles between the layers. Further, such vacuum lamination may require a preliminary partial cure at the periphery of the patch to prevent the LOCA from slumping or "oozing-out" of the initially-defined patch perimeter due to the self-leveling characteristics of the LOCA after removal of the stencil. Such slumping or "oozing-out" disadvantageously degrades the positional accuracy of patch placement on the substrate.

The present disclosure describes methods of coating a liquid onto a substrate, and in particular methods of coating a LOCA onto a rigid substrate (e.g., cover glass, indium tin oxide (ITO) touch sensor stack, polarizer, liquid crystal module, and the like) without the assistance of a printing aid (e.g., a screen, a mask, a stencil, a pre-cured dam), which at least partially overcome some or all of these deficiencies. The methods, which do not generally make use of a stencil, have been used for coating of precisely-positioned patches of high viscosity (preferably pseudoplastic and/or thixotropic) liquid compositions onto target substrates without substantial self-leveling or "oozing-out" of the patch on the substrate surface prior to application of a subsequent lamination step.

In particular, it has been found that die coating methods can be employed to dispose liquid optically clear compositions, such as adhesives and more particularly LOCA's, accurately and quickly in precision lamination applications involving gap filling between a base substrate (e.g., a display panel) and a cover substrate. Such applications include the lamination of a glass panel onto a display panel in LCD displays, or the lamination of a touch sensitive panel onto a display panel in touch-sensitive electronic devices.

The presently disclosed processes, can, in exemplary embodiments, permit significant improvements in throughput in a coating and lamination process by reducing cycle times and improving yields. Exemplary methods of the present disclosure can permit the precise positioning of a non-self-leveling liquid patch on a substrate surface with respect to a target position, achieving positional accuracy of the patch placement which has heretofore has not been obtainable in a consistent manner. Some exemplary methods of the present disclosure may be used to precisely coat a liquid optically clear adhesive onto a rigid substrate without the use of a pattern or a printing aid, such as a stencil, screen, mask or dam.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should understood that, as used herein:

The term "homogeneous" means exhibiting only a single phase of matter when observed at a macroscopic scale.

The term "liquid optically clear adhesive composition" means a liquid optically clear adhesive (LOCA) or a precursor composition which may be cured to form a LOCA.

The term "pseudoplasticity" or "pseudoplastic" with respect to a coating liquid means that the coating liquid exhibits a viscosity which decreases with increasing shear rate.

The term "thixotropy" or "thixotropic" with respect to a coating liquid means that the coating liquid exhibits a viscosity which decreases with increasing shearing time for the time interval during which the coating liquid undergoes shear during the process of applying the coating liquid to the substrate. Thixotropic coating fluids recover or "build" viscosity to at least the static viscosity upon cessation of shearing, e.g. after the coating liquid is applied to a substrate.

The term "Thixotropic Index" is a coating liquid property that refers to the ratio of the low shear viscosity measured at a shear rate of 0.1 sec$^{-1}$ to the high shear viscosity measured at 100 sec$^{-1}$.

The term "Equilibrium Viscosity" is a coating liquid property that refers to the viscosity of a coating fluid measured from a fully-relaxed (i.e., equilibrium) condition at a shear rate of 1.0 sec$^{-1}$, unless a different shear rate is expressly specified in association with a particular Equilibrium Viscosity value.

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g., dendritic) copolymers.

The term "(meth)acrylate" with respect to a monomer, oligomer or means a vinyl-functional alkyl ester formed as the reaction product of an alcohol with an acrylic or a methacrylic acid.

The term "glass transition temperature" or "$T_g$" refers to the glass transition temperature of a (co)polymer when evaluated in bulk rather than in a thin film form. In instances where a (co)polymer can only be examined in thin film form, the bulk form $T_g$ can usually be estimated with reasonable accuracy. Bulk form $T_g$ values usually are determined by evaluating the rate of heat flow vs. temperature using differential scanning calorimetry (DSC) to determine the onset of segmental mobility for the copolymer and the inflection point (usually a second-order transition) at which the copolymer can be said to change from a glassy to a rubbery state. Bulk form $T_g$ values can also be estimated using a dynamic mechanical thermal analysis (DMTA) technique, which measures the change in the modulus of the copolymer as a function of temperature and frequency of vibration.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as "atop", "on", "covering", "uppermost", "underlying" and the like for the location of various elements in the disclosed coated articles, we refer to the relative position of an element with respect to a horizontally-disposed, upwardly-facing substrate. Unless otherwise indicated, it is not intended that the substrate or articles should have any particular orientation in space during or after manufacture.

By using the term "overcoated" to describe the position of a layer with respect to a substrate or other element of an article of the present disclosure, we refer to the layer as being atop the substrate or other element, but not necessarily contiguous to either the substrate or the other element.

By using the term "separated by" to describe the position of a layer with respect to other layers, we refer to the layer as being positioned between two other layers but not necessarily contiguous to or adjacent to either layer.

The terms "about" or "approximately" with reference to a numerical value or a shape means +/− five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g., visible light) than it fails to transmit (e.g., absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Exemplary Coating Processes

The present disclosure describes a process including the steps of providing a coating head having an external opening in flow communication with a source of a first coating liquid, positioning the coating head relative to a substrate to define a gap between the external opening and the substrate, creating relative motion between the coating head and the substrate in a coating direction, and dispensing a predetermined quantity of the first coating liquid from the external opening onto at least a portion of at least one major surface of the substrate to form a discrete patch of the first coating liquid in a predetermined position on at least a portion of the major surface of the substrate. The first coating liquid as dispensed exhibits a viscosity of at least 1 Pascal-sec (Pa-s). The patch has a thickness and a perimeter. It is presently preferred that a stencil is not used to form the discrete patch.

In further exemplary embodiments, the process includes repeating the steps of the immediately preceding paragraph. In certain such exemplary embodiments, a second coating liquid different from the first coating liquid can be used. In other exemplary embodiments, a second coating liquid which is the same as the first coating liquid is used. In any of the foregoing exemplary embodiments, the second coating liquid can overlay at least a portion of the first coating liquid.

In some exemplary embodiments, the first coating liquid is dispensed at a shear rate of at least about 100 sec$^{-1}$, 200 sec$^{-1}$, 300 sec$^{-1}$, 400 sec$^{-1}$, 500 sec$^{-1}$, 600 sec$^{-1}$, 700 sec$^{-1}$, 800 sec$^{-1}$, 900 sec$^{-1}$, or even at a shear rate of at least about 1,000 sec$^{-1}$, 2,000 sec$^{-1}$, 3,000 sec$^{-1}$, 4,000 sec$^{-1}$, 5,000 sec$^{-1}$, 10,000 sec$^{-1}$, or even higher shear rate. In certain such exemplary embodiments, the first coating liquid is dispensed at a shear rate no greater than about 1,000,000 sec$^{-1}$, 750,000 sec$^{-1}$, 600,000 sec$^{-1}$, 500,000 sec$^{-1}$, 400,000 sec$^{-1}$, 300,000 sec$^{-1}$, 250,000 sec$^{-1}$, 200,000 sec$^{-1}$, or even 100,000 sec$^{-1}$.

In any of the foregoing embodiments, the first coating liquid is dispensed at a temperature from at least about 20° C., 30° C., 40° C., or 50° C.; and at most about 100° C., 90° C., 80° C., 70° C., or even 60° C.

Exemplary Coating Liquids

In presently preferred embodiments, the first coating liquid as dispensed exhibits a viscosity measured at a shear rate of 100 sec$^{-1}$ and a temperature of 25° C., of at least 1 Pascal-sec (Pa-s). However, in some exemplary embodiments, the coating liquid may advantageously exhibit a viscosity of at least 2 Pa-s, at least 3 Pa-s, at least 4 Pa-s, at least 5 Pa-s, at least 6 Pa-s, at least 7 Pa-s, at least 8 Pa-s, at least 9 Pa-s, or even at least 10 Pa-s, at least 15 Pa-s, at least 20 Pa-s, at least 30 Pa-s, at least 40 Pa-s, at least 50 Pa-s or even higher viscosity.

In certain such exemplary embodiments, the first coating liquid as dispensed exhibits a viscosity measured at a shear rate of 100 sec$^{-1}$ and a temperature of 25° C. of no greater than 1,000 Pa-s, no greater than 500 Pa-s, no greater than 400 Pa-s, no greater than 300 Pa-s, or even no greater than 200 Pa-s.

In some such exemplary embodiments, the first coating liquid as dispensed exhibits a viscosity measured at a shear rate of 100 sec$^{-1}$ and a temperature of 25° C. from about 2 Pa-s to about 50 Pa-s, 5 Pa-s to about 20 Pa-s, from about 6 Pa-s to about 19 Pa-s, from about 7 Pa-s to about 18 Pa-s, from about 8 Pa-s to about 17 Pa-s, from about 9 Pa-s to about 16 Pa-s, or even from about 10 Pa-s to about 15 Pa-s.

In further exemplary embodiments of any of the foregoing, the first coating liquid exhibits at least one distinguishing rheological characteristic selected from thixotropic rheological behavior and pseudoplastic rheological behavior. In certain exemplary embodiments, the first coating liquid exhibits a Thixotropic Index, defined as the ratio of the low shear viscosity measured at a shear rate of 0.1 sec$^{-1}$ to the high shear viscosity measured at 100 sec$^{-1}$, of at least 3, at least 4, at least 5, at least 6, at least 7, at least 8, at least 9, at least 10, or even at least 15, 20 or higher.

In some exemplary embodiments, the first coating liquid exhibits an Equilibrium Viscosity measured on a coating liquid in a fully relaxed state at a shear rate of 1 sec$^{-1}$ sufficiently high to prevent self-leveling of the coating liquid on the substrate. In certain such embodiments, the Equilibrium Viscosity measured at a shear rate of either 1 sec$^{-1}$ or 0.01 sec$^{-1}$ is at least 80 Pa-s 1, 150 Pa-s, 160 Pa-s, 170 Pa-s, 180 Pa-s, 190 Pa-s, 200 Pa-s, 225 Pa-s, 250 Pa-s, 300 Pa-s, 400 Pa-s, 500 Pa-s, or even 1,000 Pa-s or higher.

Liquid Optically Clear Adhesive Compositions

Particularly suitable liquid compositions for use in the foregoing coating processes are LOCA compositions, such as adhesives that are used in making optical assemblies. Thus, in some exemplary embodiments of any of the foregoing processes, at least one of the first coating liquid and the second coating liquid (or both) is selected to be a liquid optically clear adhesive (LOCA) composition.

In some such exemplary embodiments, the LOCA is a highly viscous Newtonian fluid having a viscosity of at least 1 Pa-s at the coating shear rate and temperature.

In some exemplary embodiments, the LOCA composition is dispensed at a shear rate of at least about 100 sec$^{-1}$, 200 sec$^{-1}$, 300 sec$^{-1}$, 400 sec$^{-1}$, 500 sec$^{-1}$, 600 sec$^{-1}$, 700 sec$^{-1}$, 800 sec$^{-1}$, 900 sec$^{-1}$, or even at a shear rate of at least about 1,000 sec$^{-1}$, 2,000 sec$^{-1}$, 3,000 sec$^{-1}$, 4,000 sec$^{-1}$, 5,000 sec$^{-1}$, 10,000 sec$^{-1}$, or even higher shear rate. In certain such exemplary embodiments, the LOCA composition is dispensed at a shear rate no greater than about 1,000,000 sec$^{-1}$, 750,000 sec$^{-1}$, 600,000 sec$^{-1}$, 500,000 sec$^{-1}$, 400,000 sec$^{-1}$, 300,000 sec$^{-1}$, 250,000 sec$^{-1}$, 200,000 sec$^{-1}$, or even 100,000 sec$^{-1}$.

In any of the foregoing embodiments, the LOCA composition is dispensed at a temperature from at least about 20° C., 30° C., 40° C., or 50° C.; and at most about 100° C., 90° C., 80° C., 70° C., or even 60° C.

In presently preferred embodiments, the LOCA composition as dispensed exhibits a viscosity measured at a shear rate of 100 sec$^{-1}$ and a temperature of 25° C., of at least 1 Pascal-sec (Pa-s). However, in some exemplary embodiments, the LOCA composition may advantageously exhibit a viscosity of at least 2 Pa-s, at least 3 Pa-s, at least 4 Pa-s, at least 5 Pa-s, at least 6 Pa-s, at least 7 Pa-s, at least 8 Pa-s, at least 9 Pa-s, or even at least 10 Pa-s, at least 15 Pa-s, at least 20 Pa-s, at least 30 Pa-s, at least 40 Pa-s, at least 50 Pa-s or even higher viscosity.

In certain such exemplary embodiments, the LOCA composition as dispensed exhibits a viscosity measured at a shear rate of 100 sec$^{-1}$ and a temperature of 25° C. of no greater than 1 MPa-s, no greater than 500 Pa-s, no greater than 400 Pa-s, no greater than 300 Pa-s, or even no greater than 200 Pa-s.

In some such exemplary embodiments, the LOCA composition as dispensed exhibits a viscosity measured at a shear rate of 100 sec$^{-1}$ and a temperature of 25° C. from about 2 Pa-s to about 50 Pa-s, 5 Pa-s to about 20 Pa-s, from about 6 Pa-s to about 19 Pa-s, from about 7 Pa-s to about 18 Pa-s, from about 8 Pa-s to about 17 Pa-s, from about 9 Pa-s to about 16 Pa-s, or even from about 10 Pa-s to about 15 Pa-s.

In some exemplary embodiments, the LOCA composition preferably exhibits pseudoplastic and/or thixotropic rheological behavior. Such LOCA compositions exhibit a solid like behavior at little to no shear (e.g. at least about 500 Pa-s at 0.01 s$^{-1}$), while being flowable during the coating process when a higher amount of shear is applied (e.g. less more than 1 Pa-s but less than about 500 Pa-s at about 1-5,000 s$^{-1}$). Pseudoplastic LOCA compositions exhibit shear thinning rheological behavior in which the viscosity decreases with increasing shear rate to reach a high shear rate (e.g. at a shear rate greater than 1,000 sec$^{-1}$) limiting viscosity, then recovering to rebuild viscosity upon cessation of shearing. Thixotropic LOCA compositions exhibit time-dependent rheological properties, decreasing in viscosity with increasing shearing duration to reach a limiting viscosity, then recovering to rebuild viscosity within a finite time frame after the cessation of shearing.

The pseudoplastic and/or thixotropic LOCA composition recovers its high viscosity properties within a short time frame (e.g. less than 1 second) after completion of the coating process. In other words, the LOCA composition in the coated patch does not substantially self-level, thereby ensuring that dimensional tolerances of the coated patch are maintained. LOCA compositions that are both pseudoplastic and thixotropic may be particularly useful in practicing exemplary processes of the present disclosure, as such properties help ensure that the desired positional and dimensional tolerances of the patch coated on the substrate are maintained.

Thus, in further exemplary embodiments of the foregoing, the LOCA composition exhibits at least one distinguishing rheological characteristic selected from thixotropic rheological behavior and pseudoplastic rheological behavior. In certain exemplary embodiments, the LOCA composition exhibits a Thixotropic Index, defined as the ratio of the low shear viscosity measured at a shear rate of 0.1 sec$^{-1}$ to the high shear viscosity measured at 100 sec$^{-1}$, of at least 1, at least 2, at least 3, at least 4, at least 5, at least 6, at least 7, at least 8, at least 9, at least 10, or even at least 15, 20 or higher.

In some exemplary embodiments, the LOCA composition exhibits an Equilibrium Viscosity measured on a coating liquid in a fully relaxed state at a shear rate of 1 sec$^{-1}$ sufficiently high to prevent self-leveling of the coating liquid on the substrate. In certain such embodiments, the Equilibrium Viscosity measured at a shear rate of 1 sec$^{-1}$ or 0.01 sec$^{-1}$ is at least 80 Pa-s, 150 Pa-s, 160 Pa-s, 170 Pa-s, 180 Pa-s, 190 Pa-s, 200 Pa-s, 225 Pa-s, 250 Pa-s, 300 Pa-s, 400 Pa-s, 500 Pa-s, or even 1,000 Pa-s or higher.

In some embodiments, the LOCA composition has a displacement creep of about 0.2 radians or less when a stress of 10 Pa is applied to the adhesive for 2 minutes. Particularly, the LOCA composition has a displacement creep of about 0.1 radians or less when a stress of 10 Pa is applied to the adhesive for 2 minutes. In general, displacement creep is a value determined using an AR2000 Rheometer manufactured by TA Instruments having with a measurement geometry of a 40 mm diameter×1° cone at 25° C., and is defined as the rotational angle of the cone when a stress of 10 Pa is applied to the adhesive. The displacement creep is related to the ability of the thixotropic adhesive layer to resist flow, or sag, under very low stress conditions, such as gravity and surface tension.

In some embodiments, the LOCA composition has a delta of 45 degrees or less, particularly 42 or less, particularly 35 degrees or less and more particularly 30 degrees or less when a torque of 80 microN·m is applied at a frequency of 1 Hz in a cone and plate rheometer. Delta is the phase lag between stress and strain where an oscillatory force (stress) is applied to a material and the resulting displacement (strain) is measured. Delta is assigned units of degrees. The delta is related to the "solid" behavior of the pseudoplastic and/or thixotropic adhesive layer or its non-sag property at very low oscillatory stress.

The adhesive layer also has the ability to regain its non-sag structure within a short amount of time after passing underneath the coating die slot. In one embodiment, the recovery time of the adhesive layer is less than about 60 seconds, particularly less than about 30 seconds, and more particularly less than about 10 seconds to reach a delta of 35 degrees after a torque of about 1000 microN·m is applied for about 60 seconds at a frequency of 1 Hz and immediately followed by a torque of 80 microN·m at a frequency of 1 Hz.

In some of the foregoing embodiments, the LOCA composition includes a reaction product of a multifunctional (meth)acrylate oligomer and a reactive diluent including a monofunctional (meth)acrylate monomer having a viscosity of from 0.004 to 0.020 Pascal-sec measured at a shear rate of 1 sec$^{-1}$ and a temperature of 25° C., and at least one of a plasticizer or a monofunctional (meth)acrylate monomer having alkylene oxide functionality. In certain such exemplary embodiments of any of the foregoing, the multifunctional (meth)acrylate oligomer includes any one or more of a multifunctional urethane (meth)acrylate oligomer, a multifunctional polyester (meth)acrylate oligomer, and a multifunctional polyether (meth)acrylate oligomer.

In other exemplary embodiments of any of the foregoing processes, the LOCA composition includes a reaction product of a multifunctional rubber-based (meth)acrylate oligomer and a monofunctional (meth)acrylate monomer having a pendant alkyl group of from about 4 to 20 carbon atoms, and a liquid rubber. In certain such exemplary embodiments, the multifunctional rubber-based (meth)acrylate oligomer comprises any one or more of a multifunctional polybutadiene (meth)acrylate oligomer, a multifunctional isoprene (meth)acrylate oligomer, and a multifunctional (meth)acrylate oligomer including a copolymer of butadiene and isoprene. Optionally, the liquid rubber includes liquid isoprene.

In further exemplary embodiments of any of the foregoing processes, the LOCA composition is a curable composition including (a) a (meth)acryolyl oligomer having a $M_w$ of 5 to 30 kDa and a $T_g$ of less than 2° C. including: (i.) greater than 50 parts by weight of (meth)acrylate ester monomer units, (ii.) 10 to 49 parts by weight of hydroxyl-functional monomer units, (iii.) 1 to 10 parts by weight of monomer units having pendent acrylate groups, (iv.) 0 to 20 parts by weight of polar monomer units, (v.) 0 to 10 parts by weight of silane-functional monomer units, wherein the sum of the monomer units is 100 parts by weight; (b) a diluent monomer component; and (c) a photoinitiator. The curable composition includes no crosslinking agents. In certain such embodiments, the diluent monomer component comprises at least one monomer selected from acrylate ester monomer units, hydroxyl-functional monomer units; monomer units having pendent acrylate groups, polar monomer units, and silane-functional monomer units.

Suitable LOCA compositions are described in PCT International Pub. Nos. WO 2010/111316, WO 2011/119828, WO 2012/036980, and WO 2013/049133; and in U.S. Prov. Pat. App. 61/652,386 filed May 29, 2012 and titled "LIQUID OPTICALLY CLEAR ADHESIVE COMPOSITIONS".

Additives

In any of the foregoing exemplary embodiments, the LOCA composition may advantageously include at least one additive selected from heat stabilizers, antioxidants, antistatic agents, thickeners, fillers, pigments, dyes, colorants, thixotropic agents, processing aids, nanoparticles, and fibers. In certain such embodiments, the additive is present in an amount of 0.01 to 10 wt. % relative to the mass of the liquid optically clear adhesive composition. In some exemplary embodiments, the liquid optically clear adhesive composition further includes metal oxide nanoparticles having a median particle diameter of 1 nm to about 100 nm in an amount of 1 to 10 wt. %, relative to the total weight of the liquid optically clear adhesive composition.

In general, the LOCA composition may comprise metal oxide particles, for example, to modify the refractive index of the adhesive layer or the viscosity of the liquid adhesive composition (as described below). Metal oxide particles that are substantially transparent may be used. For example, a 1 mm thick disk of the metal oxide particles in an adhesive layer may absorb less than about 15% of the light incident on the disk.

Examples of metal oxide particles include clay, $Al_2O_3$, $ZrO_2$, $TiO_2$, $V_2O_5$, $ZnO$, $SnO_2$, $ZnS$, $SiO_2$, and mixtures thereof, as well as other sufficiently transparent non-oxide ceramic materials. The metal oxide particles can be surface treated to improve dispersibility in the adhesive layer and the composition from which the layer is coated. Examples of surface treatment chemistries include silanes, siloxanes, carboxylic acids, phosphonic acids, zirconates, titanates, and the like. Techniques for applying such surface treatment chemistries are known. Organic fillers such as cellulose, castor-oil wax and polyamide-containing fillers may also be used.

In some exemplary embodiments, LOCA compositions can be made thixotropic by adding particles to the compositions. In some embodiments, fumed silica is added to impart thixotropic properties to a liquid adhesive, in an amount of from about 2 to about 10 wt %, or from about 3.5 to about 7 wt %.

In some embodiments, the LOCA composition comprises a fumed silica. Suitable fumed silicas include, but are not limited to: AEROSIL 200; and AEROSIL R805 (both available from Evonik Industries); CAB-O-SIL TS 610; and CAB-O-SIL T 5720 (both available from Cabot Corp.), and HDK H2ORH (available from Wacker Chemie AG).

In some embodiments, the LOCA composition comprises a fumed aluminum oxide, such as AEROXIDE ALU 130 (available from Evonik, Parsippany, N.J.).

In some embodiments, the LOCA composition comprises clay such as GARAMITE 1958 (available from Southern Clay Products).

Metal oxide particles may be used in an amount needed to produce the desired effect, for example, in an amount of from about 2 to about 10 wt. %, from about 3.5 to about 7 wt. %, from about 10 to about 85 wt. %, or from about 40 to about 85 wt. %, based on the total weight of the adhesive layer. Metal oxide particles may only be added to the extent that they do not add undesirable color, haze or transmission characteristics. Generally, the particles can have an average particle size of from about 1 nm to about 100 nm.

In some embodiments, the LOCA composition comprises nonreactive oligomeric rheology modifiers. While not wishing to be bound by theory, non reactive oligomeric rheology modifiers build viscosity at low shear rates through hydrogen bonding or other self-associating mechanisms. Examples of suitable nonreactive oligomeric rheology modifiers include, but are not limited to: polyhydroxycarboxylic acid amides (such as BYK 405, available from Byk-Chemie GmbH, Wesel, Germany), polyhydroxycarboxylic acid esters (such as BYK R-606, available from Byk-Chemie GmbH, Wesel, Germany), modified ureas (such as DISPARLON 6100, DISPARLON 6200 or DISPARLON 6500 from King Industries, Norwalk, Conn. or BYK 410 from Byk-Chemie GmbH, Wesel, Germany), metal sulfonates (such as K-STAY 501 from King Industries, Norwalk, Conn. or IRCOGEL 903 from Lubrizol Advanced Materials, Cleveland, Ohio), acrylated oligoamines (such as GENOMER 5275 from Rahn USA Corp, Aurora, Ill.), polyacrylic acids (such as CARBOPOL 1620 from Lubrizol Advanced Materials, Cleveland, Ohio), modified urethanes (such as K-STAY 740 from King Industries, Norwalk, Conn.), or polyamides.

In some embodiments, non-reactive oligomeric rheology modifiers are chosen to be miscible and compatible with the optically clear adhesive to limit phase separation and minimize haze.

Photoinitiators may be used in the liquid compositions when curing with UV radiation. Photoinitiators for free radical curing include organic peroxides, azo compounds, quinines, nitro compounds, acyl halides, hydrazones, mercapto compounds, pyrylium compounds, imidazoles, chlorotriazines, benzoin, benzoin alkyl ethers, ketones, phenones, and the like. For example, the adhesive compositions may comprise ethyl-2,4,6-trimethylbenzoylphenylphosphinate available as LUCIRIN TPOL from BASF Corp. or 1-hydroxycyclohexyl phenyl ketone available as IRGACURE 184 from Ciba Specialty Chemicals. The photoinitiator is often used at a concentration of about 0.1 to 10 weight percent or 0.1 to 5 weight percent based on the weight of oligomeric and monomer material in the polymerizable composition.

The liquid compositions and adhesive layers can optionally include one or more additives such as chain transfer agents, antioxidants, stabilizers, fire retardants, viscosity modifying agents, antifoaming agents, antistatic agents and wetting agents. If color is required for the optical adhesive, colorants such as dyes and pigments, fluorescent dyes and pigments, phosphorescent dyes and pigments can be used.

Exemplary Substrates

Many of the contemplated embodiments of the present process involve formation of a patch of liquid optically clear conductive adhesive on a rigid sheet or rigid article, e.g. the cover glass for an optical display or a liquid crystal display (LCD) module. However, some contemplated embodiments involve formation of a patch of liquid optically clear conductive adhesive on a transparent flexible sheet or a transparent flexible web of indefinite length in a roll-to-roll process. Flexible substrates may include flexible glass sheets or webs. A discussion of how flexible glass sheets or webs may be successfully handled in these sorts of embodiments can be found in U.S. Patent Application Pub. No. 2013/0196163.

Thus, in additional exemplary embodiments, the substrate is a light emitting display component or a light reflecting device component. In some exemplary embodiments, the substrate is substantially transparent. In certain exemplary embodiments, the substrate is comprised of glass. In some particular embodiments, the substrate is flexible.

In additional exemplary embodiments, the substrate is a polymeric sheet or web. Suitable polymeric materials include, for example, polyesters such as polyethylene terephthalate (PET), polylactic acid (PLA) and polyethylene naphthalate (PEN); polyimides such as KAPTON (available from DuPont deNemours Corp., Wilmington, Del.); polycarbonates such as LEXAN (available from SABIC Innovative Plastics, Pittsfield, Mass.); cyclo olefin polymers such as ZEONEX or ZEONOR (available from Zeon Chemicals LP, Louisville, Ky.); and the like.

Exemplary Coating Apparatus

Various exemplary embodiments of the disclosure will now be described with particular reference to the Drawings.

Referring now to FIG. 1, an exemplary coating apparatus 50 is illustrated. The apparatus 50 includes a support 52 for the substrate 22a on which the patch 24 is to be dispensed. Support 52 is moved by an actuator 54 (conveniently a zero-backlash actuator) during the coating of the patch 24. Actuator 54 (among other things) is controlled by controller 60 via signal line 62. In some convenient embodiments, the actuator 54 may have an encoder that reports back to controller 60; in other convenient embodiments, a separate encoder may be provided for this purpose. While the support 52 in the illustrated embodiment is flat, if the substrate 22a is flexible or arcuate, a cylindrical support moved by a rotational actuator is considered within the scope of the disclosure. Positioned adjacent to the support 52 is a coating head 70, which in the illustrated embodiment is a slot die. The coating head 70 has an external opening 72, which in the convenient illustrated embodiment is a slot. The coating head 70 is moveably mounted so that the distance from its external opening 72 from the surface of the substrate 22a can be controlled by linear actuator 74, which is in turn controlled by controller 60 via signal line 76. (Coating head 70 is shown in partial cutaway to reveal certain internal structures) At least one position sensor 78 is positioned so as to sense the distance between the external opening 72 from the surface of the substrate 22a, and it reports this information to controller 60 via signal line 80.

The coating head 70 conveniently has a cavity 82 which receives coating liquid from syringe pump 90 via line 92 and delivers fluid to external opening 72. The plunger 94 of syringe 90 is moved by actuator 96. A sensor 98 may be positioned so as to sense the exact position of the plunger 94 provides feedback via line 100 to controller 60 and indirectly to actuator 96 via signal line 102. Controller 60 provides a signal to the actuator 96 based on the input of sensor 98 and according to an equation discussed below which preferably takes into account not only the position function, but also its first, second, and third derivatives. The bandwidth of the sensor-controller-actuator system is preferably high, e.g. 100 Hz.

In the illustrated embodiment, liquid optically clear adhesives can be drawn from a reservoir 104 via fluid line 106. A valve 110 is under the control of controller 60 via line 112 for the purpose of cycling the system when the syringe pump needs to be recharged.

In a presently preferred embodiment of the present disclosure in which the coating liquid is a LOCA, best results are generally achieved if there is low compliance within the syringe pump/fluid line/coating head system. Air bubbles anywhere within this zone form an undesirable source of compliance. Therefore, in some convenient embodiments, plunger 94 includes a purge valve through which air bubbles can be purged from the system. In order to detect when inadvertent compliance has entered the system, pressure sensors, positioned at, e.g. 114 and 116, and reporting to controller 60 via signal lines 118 and 120 respectively may be present. Alternatively, the current drawn by actuator 96 can be monitored in lieu of the monitoring the pressure. As a further alternative, the system can also verify proper purging by dynamically measuring compliance. A low displacement, high frequency motion from the syringe pump while monitoring pressure can detect unwanted compliance in the system.

Improved coating can be achieved as described below when the exact present viscosity of the liquid optically clear adhesive is known. Therefore in some convenient embodiments, an orifice 122 is present, and pressure sensors 124 and 126 provide information on the pressure drop across the predetermined static or variable orifice 122 via signal lines 128 and 130 respectively, which information can be processed to take viscosity into account. Adjustability of orifice 122 is sometimes desirable when the apparatus is asked to handle a wide range a viscosities and flow rates. A display and/or input device 140 in the form of a microcomputer or the like may be present, connected to the controller via data lines, collectively 142.

The coating head is preferably mounted to a fixture that prevents sagging of the coating head. The fixture also has precise positioning, particularly with respect to the z-axis, to enable control of the height of the coating head relative to the substrate. In one embodiment, the z-axis position can be controlled to within about 0.002 inch (0.00508 cm), particularly to within about 0.0001 inch (0.000254 cm), and more particularly to within about 0.00001 inch (0.0000254 cm).

In one embodiment, the rigid platform, and thus the substrate, moves relative to the coating head during the coating process. In another embodiment, the substrate is fixed while the coating head moves relative to the rigid platform during the coating process. At the end of the coating process and up through lamination to another substrate, the height and dimensional tolerance of the coated LOCA remain within certain dimensional tolerances.

In additional exemplary embodiments of any of the foregoing, the coating head can be selected from the group consisting of a single slot die, a multiple slot die, a single orifice die, and a multiple orifice die. In certain such embodiments, the coating head is a single slot die having a single die slot, further wherein the external opening is comprised of the die slot. In some particular such embodiments, the geometry of the single slot die is selected from a sharp-lipped extrusion slot die, a slot fed knife die with a land, or a notched slot die.

Thus in one presently preferred embodiment, the coating head includes a slot die. Slot die printing and coating methods, which have been used for adhesive coating for web or film to make tape and film products or surface coating, have been found to provide a suitable method for printing liquid compositions onto a target substrate. Slot dies can be employed to dispose liquid optically clear compositions, such as adhesives, accurately and quickly in precision lamination applications involving gap filling between display panel and a cover substrate, such as applications involving the lamination of a glass panel onto a display panel in LCD displays, or the lamination of a touch sensitive panel onto a display panel in touch-sensitive electronic devices.

An example of a slot die for dispensing a feed stream of a liquid composition is described in PCT International Pub. No. WO 2011/087983. Such a slot die can be used to dispense liquid optically clear compositions onto a substrate.

Parameters such as slot height and/or length, conduit diameter, flow channel widths may be selected to provide for a desired layer thickness profile. For example, the cross-sectional area of flow channels 50 and 52 may be increased or decreased. It may be varied along its length to provide a certain pressure gradient that, in turn, may affect the layer thickness profile of multilayer flow stream 32. In this manner, the dimensions of one or more of the flow defining sections may be designed to influence the layer thickness distribution of the flow stream generated via feedblock 16, e.g., based on a target layer thickness profile.

In one embodiment, the coating head includes a slot fed knife die containing a converging channel. The geometry of the die could be a sharp lipped extrusion die or a slot fed knife with land on either or both the upstream and downstream lips of the die. A converging channel is preferred to avoid down-web ribbing and other coating defects. (See Coating and Drying Defects: Troubleshooting Operating Problems, E. B. Gutoff, E. D. Cohen, G. I. Kheboian, (John Wiley and Sons, 2006) pgs 131-137). Such coating defects could lead to mura and other noticeable optical defects in the display assembly.

In any of the foregoing exemplary embodiments, the source of the first coating liquid comprises a pre-metered coating liquid delivery system selected from a syringe pump, a dosing pump, a gear pump, a servo-driven positive displacement pump, a rod-driven positive displacement pump, or a combination thereof.

In some exemplary embodiments, the coating head is preferably built to handle pressures to shear the LOCA into the desired viscosity range. The LOCA dispensed through the coating head may optionally be pre-heated or heated in the coating head to lower the viscosity of the LOCA and aid the coating process. In some exemplary embodiments, a vacuum box is positioned adjacent to the leading lip of the die to ensure that air is not entrapped between the LOCA and the substrate and to stabilize the coating bead.

In one embodiment, the coating head is a knife-coater, in which a sharp edge is used to meter the fluid onto the substrate. The coating thickness is generally determined by the gap between the knife and the substrate. The gap is preferably well-controlled and is controlled in one embodiment to within about 0.002 inch (0.00508 cm), particularly to within about 0.0001 inch (0.000254 cm), and more particularly to within about 0.00001 inch (0.0000254 cm).

An example of a knife-coater coating head includes, but is not limited to, a β COATER SNC-280 commercially available from Yasui-Seiki Co., Bloomington, Ind.

An appropriate liquid feed for the first coating fluid (or LOCA), is required. The liquid feed may include, but is not limited to: a syringe, needle die, hopper or a liquid dispensing manifold. The liquid feed is engaged to dispense enough of the first coating liquid or LOCA for a particular thickness over the coating area on the substrate (potentially through the use of a precision syringe pump).

In some particular exemplary embodiments of the foregoing, at least one pressure sensor communicating with the source of the first coating liquid or LOCA is used to measure a delivery pressure of the first coating liquid or LOCA. The delivery pressure is used to control at least one of the delivery rate of the first coating liquid to the substrate, or a quality characteristic of the patch.

Suitable quality characteristics include the thickness uniformity of the patch, the positional accuracy and/or precision of the patch position on the substrate relative to a target position (as described further in the next section), the uniformity of the patch perimeter (e.g. the "squareness" of a patch having a square-shaped perimeter), the straightness of an edge of the patch, the absence of coating defects (e.g. bubbles, voids, entrained foreign matter, surface irregularities, and the like), the quantity (e.g. by weight or volume) of the first coating liquid forming the patch, and the like.

Exemplary Coated Articles and Laminates

Figure 2A:
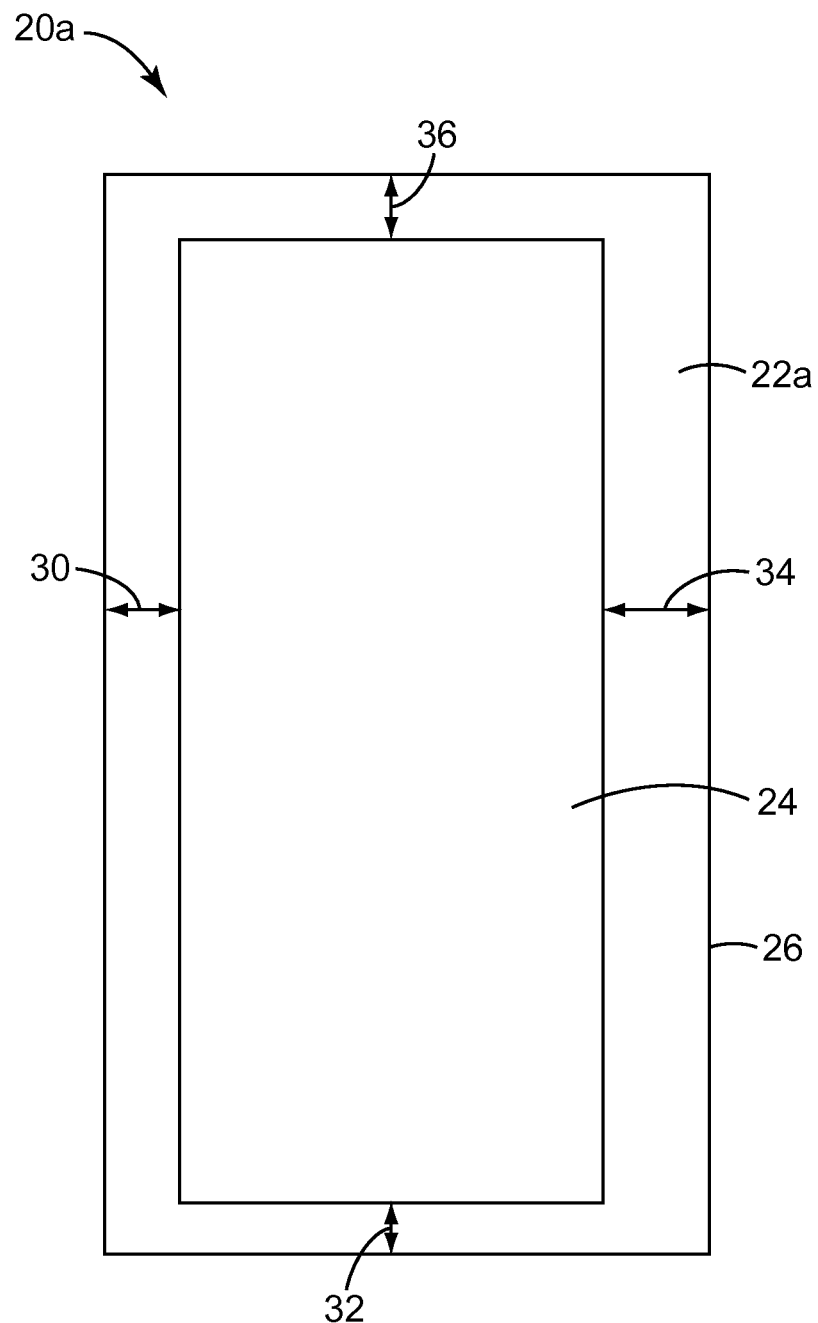
FIG. 2A is a top view of a portion of a sheet of substrate material having disposed thereon an exemplary patch of coated liquid.

Referring now to FIG. 2A, a top view of a coated sheet 20a, including piece of sheet material 22a and a patch 24 of coated liquid disposed upon one of its major surfaces, is illustrated. In the illustrated embodiment, the patch 24 is not coated all the way to the margins 26 of the piece of sheet material 22a, leaving uncoated margins 30, 32, 34, and 36 on all sides of the perimeter of the patch 24. In many applications where the coated patch 24 is to be used in, e.g. a liquid crystal display for a hand-held device, it is convenient to have such margins. Further, it is often convenient for one or more of these margins 30, 32, 34, and 36 to have a pre-determined width, accurate to a close tolerance.

In such applications, positional accuracy within 0.3 mm, or even 0.1 mm can be achieved with the present disclosure. In further exemplary embodiments of any of the foregoing, the perimeter of the patch is defined by a plurality of lateral edges of the patch. In such applications, positional accuracy of the patch within +/−0.3 mm, or even +/−0.1 mm can be achieved with the present disclosure. In some such embodiments, at least one lateral edge of the patch is positioned relative to an edge of the substrate to within +/−1,000 µm, +/−750 µm+/−500 µm, +/−400 µm, +/−300 µm, or even within +/−200 µm or +/−100 µm of a target position.

However, the placement of patches when the size of the margin is not critical, or even when the patches are coated all the way to one or more of the margin edges 26, are considered to be within the scope of the disclosure. In the illustrated embodiment, the patch has a substantially uniform thickness, but this is not considered a requirement of the disclosure, as will be discussed with more particularity in connection with FIGS. 2C and 2D below.

In some exemplary embodiments, the LOCA is dispensed so as to generate a patch having a thickness of between about 1 µm and about 5 mm, more particularly of between about 50 µm and about 5 mm, even more particularly of between about 50 µm and about 1 mm, and still more particularly between about 50 µm and about 0.3 mm. In some exemplary embodiments, the thickness over the entire coating region is within less than about 100 µm of a predetermined target coating thickness, particularly within less than about 50 µm of the target coating thickness, more particularly within about 30 µm of the target coating thickness, and still more particularly within about 5 µm of the target coating thickness.

In some exemplary embodiments, the substrate and the coating head move at a speed of between about 0.1 mm/s and about 3000 mm/s relative to one another, particularly between about 1 mm/s and about 1000 mm/s relative to one another, and more particularly between about 3 mm/s and about 500 mm/s relative to one another.

Figure 2B:
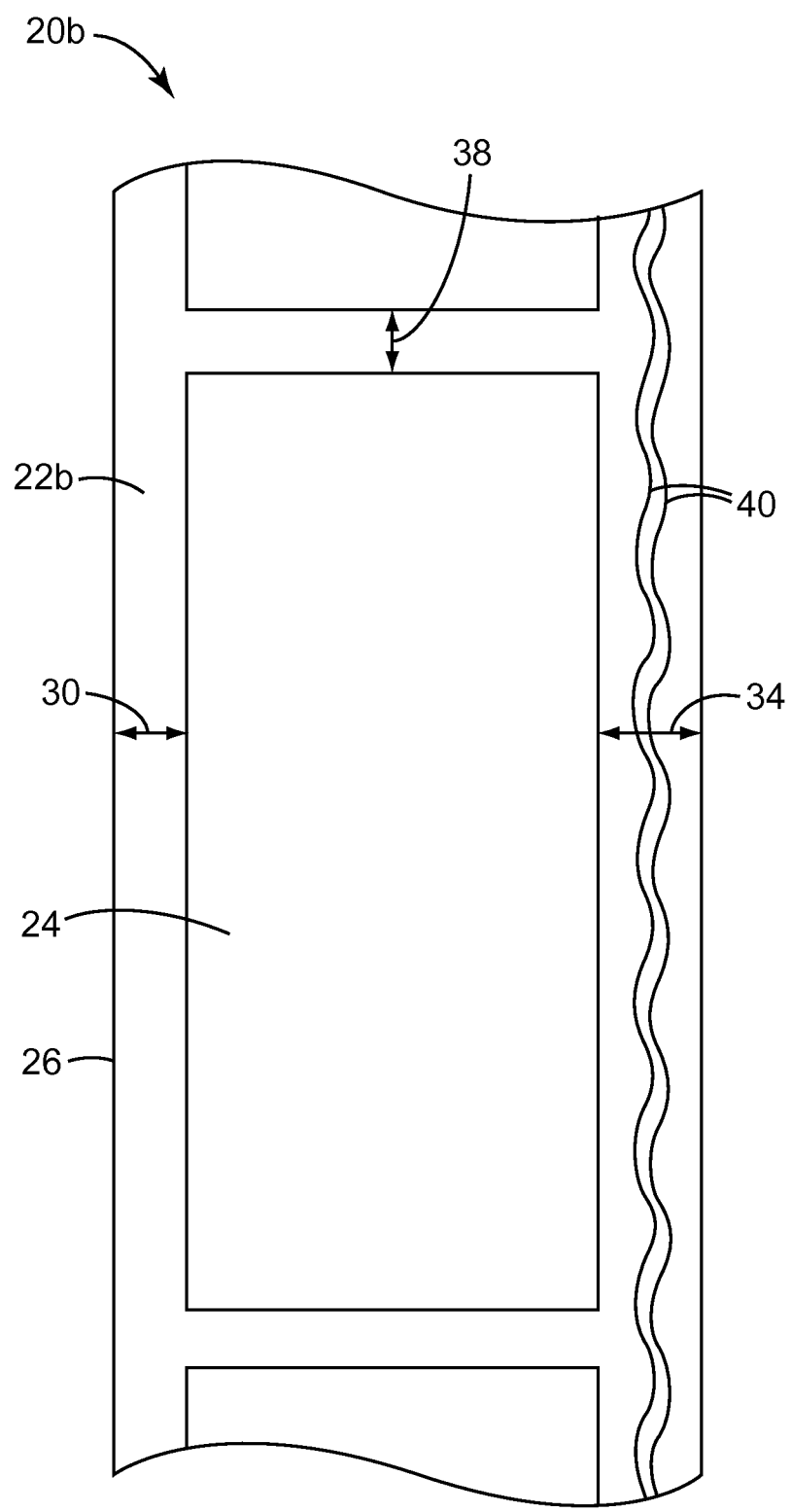
FIG. 2B is a top view of a section along the length of a web of indefinite length material having disposed thereon a series of patches of coated liquid.

Referring now to FIG. 2B, a top view of a section along the length of a coated web 20*b* of indefinite length material, including the web 22*b* and a series of patches 24 of coated liquid disposed along it, is illustrated. In the illustrated embodiment, the patch 24 is not coated all the way to the margins 26 of the piece of web 22*b*, leaving uncoated margins 30, and 34 on the sides of the patch 24, and an uncoated space 38 between one patch 24 and the next. In many applications where the coated patch 24 is to be used in, e.g. a liquid crystal display for a hand-held device, it is convenient to have such margins. Further, it is often convenient for one or more of these margins 30 and 34, and uncoated space 38 to have a pre-determined width, accurate to a close tolerance.

In such applications, positional accuracy within 0.3 mm, or even −0.1 mm can be achieved with the present disclosure. In some such embodiments, at least one lateral edge of the patch is positioned relative to an edge of the substrate to within +/−1,000 µm, +/−750 µm+/−500 µm, +/−400 µm, +/−300 µm, or even within +/−200 µm or +/−100 µm of a target position.

However, the placement of patches when the size of the margin is not critical, or even when the patches are coated all the way to one or more of the margin edges 26, are considered to be within the scope of the disclosure.

Further, the illustrated embodiment includes fiducial marks 40 which can be used to determine the position of the web 22*b* with great accuracy in both the machine direction and the cross-direction. A more complete discussion of the creation and interpretation of diverse fiducial marks can be found in U.S. Pat. No. 8,405,831 and U.S. Patent Application Pub. Nos. 2010/0188668, 2010/0196607, 2011/0247511, and 2011/0257779.

Figure 2C:
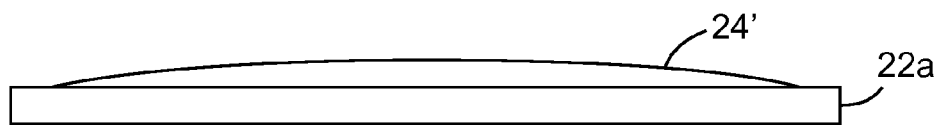
FIG. 2C is a side view of a portion of a sheet of substrate material having an exemplary patch of coated liquid having a deliberately non-uniform side profile disposed on it.
Figure 2D:
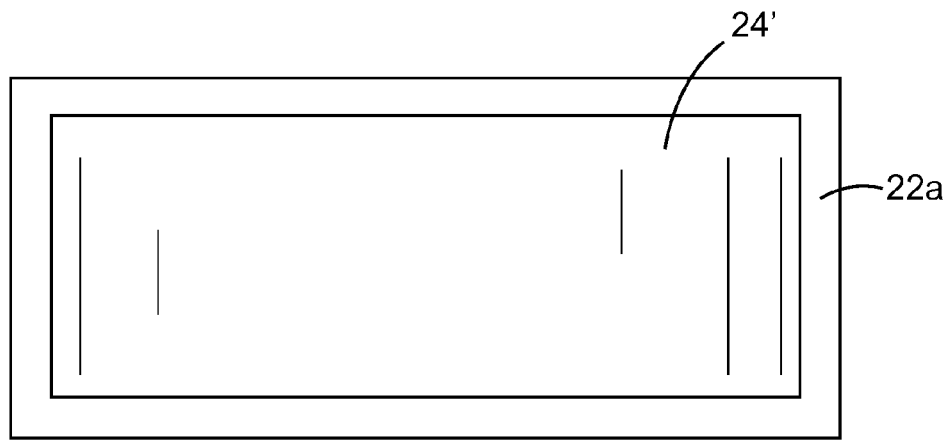
FIG. 2D is a top view of the coated sheet of FIG. 2C.

Referring now to FIG. 2C, a side view of a portion of a sheet of substrate material 22*a* having a patch of coated liquid 24' disposed on one of its major surfaces, is illustrated. In this FIGURE, patch 24' has a thickness with a deliberately non-uniform side profile. The apparatus of FIG. 1 can produce such a patch by first gradually ramping up the pumping rate and gradually withdrawing the first coating head 70 as the substrate is translated to create the gentle curved slope up to the peak, then gradually decreasing the pumping rate and advancing the coating head 70 as the substrate is translated. The ordinary artisan will perceive that with a sufficiently detailed programming the controller 60 can produce many profiles for various end uses as long as they are within the bandwidth of the apparatus 50 and the viscosity limitations of the LOCA composition (the composition has a finite Equilibrium Viscosity and cannot be expected to adopt the shape of extremely small features). FIG. 2D is a top view of the coated sheet of FIG. 2C. While patches that are as nearly rectilinear as possible are desirable for some purposes, the techniques of the present disclosure may be used to create profiled patches that are useful for other purposes. In particular, profiled patch 24' may make the lamination of a rigid cover layer easier.

Figure 2E:
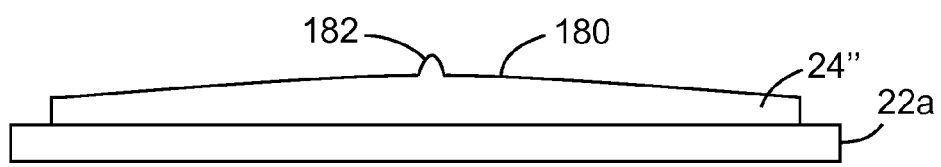
FIG. 2E is a side view of a portion of a sheet of substrate material having disposed thereon an intentionally non-uniform patch of coated liquid exhibiting an exemplary non-uniform side profile of two elliptically-shaped ribs arranged in a crosswise manner substantially orthogonal to each other.
Figure 2F:
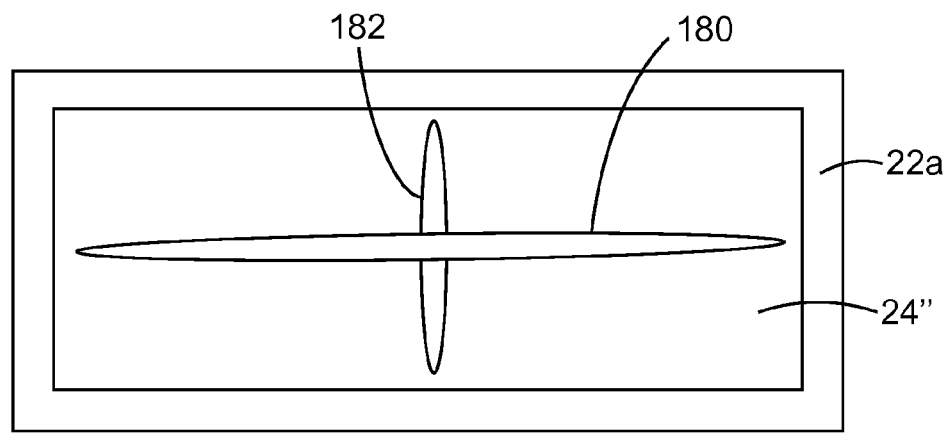
FIG. 2F is a top view of the coated sheet of FIG. 2E.

Referring now to FIG. 2E, a side view of a portion of a sheet of substrate material 22*a* having a patch of coated liquid 24" disposed on one of its major surfaces, is illustrated. In patch 24" the coated liquid has a thickness with a deliberately non-uniform side profile. FIG. 2F is a top view of the coated sheet of FIG. 2E. In this view a longitudinal stripe 180 has been created by having an exceptionally wide spot in the slot of the slot die, while crosswise stripe 182 has been created by moving the slot away from the substrate 22*a* briefly at the proper moment as the substrate 22*a* is in motion. During this brief moving away, the pumping rate needs to be increased appropriately to deliver the needed extra volume of LOCA.

Figure 2G:
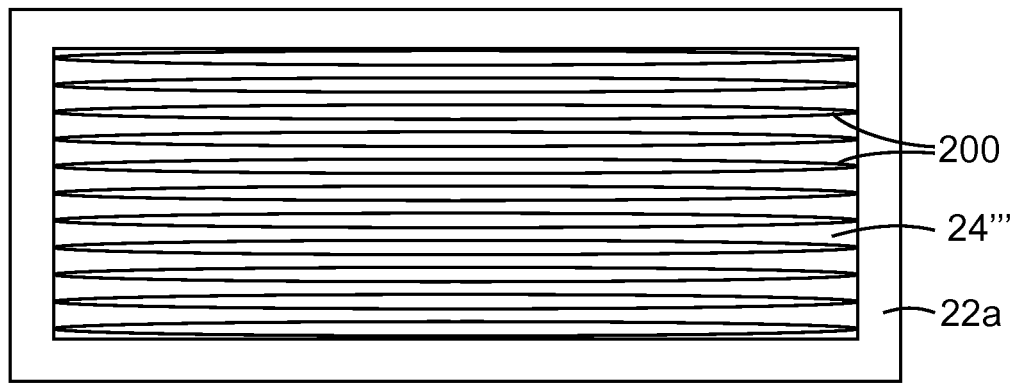
FIG. 2G is a top view of a portion of a sheet of substrate material having disposed thereon an intentionally non-uniform patch of coated liquid exhibiting an exemplary non-uniform side profile of a plurality of substantially parallel elliptically-shaped ribs arranged on a major surface of the substrate

Referring now to FIG. 2G, a side view of a portion of a sheet of substrate material 22*a* having a patch of coated liquid 24''' disposed on one of its major surfaces, is illustrated. In patch 24' coated liquid has a thickness with a deliberately non-uniform side profile. In this view a series of longitudinal ribs 200 has been created by having a series of exceptionally wide spots in the slot of the slot die. This may be referred to as a notched slot or a notched die. An alternative way of achieving a similar surface conformation would be to contact a patch created by a straight slot die with a contacting tool post-coating. For instance, a wire wound rod can be manually pulled over the coating to create a ribbed structure.

Figure 2H:
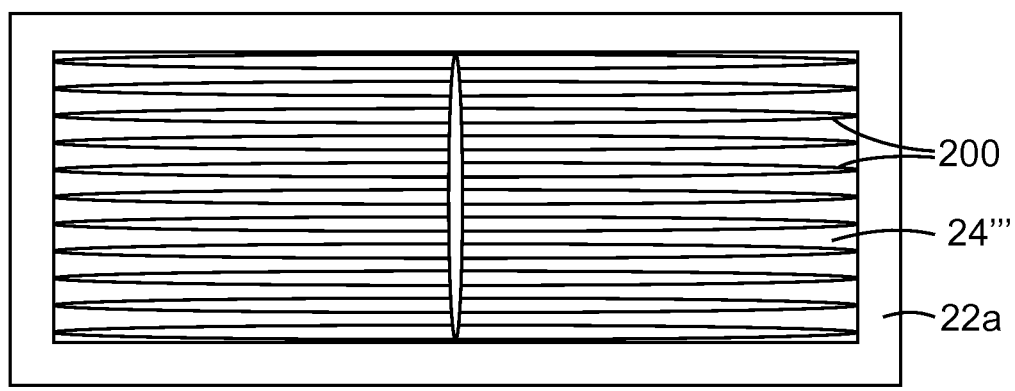
FIG. 2H is a top view of a portion of a sheet of substrate material having disposed thereon an intentionally non-uniform patch of coated liquid exhibiting an exemplary non-uniform side profile of a plurality of substantially parallel elliptically-shaped ribs arranged on a major surface of the substrate, and a single rib arranged in a crosswise manner substantially orthogonal to the plurality of substantially parallel elliptically-shaped ribs.

Referring now to FIG. 2H, a top view of a coated sheet similar to that of FIG. 2G, except that in addition to longitudinal ribs 200, a crosswise stripe 202 has been created by moving the slot away from the substrate 22*a* briefly at the proper moment as the substrate 22*a* is in motion. Similarly to the discussion above in connection with FIG. 2F, during this brief moving away, the pumping rate needs to be increased appropriately to deliver the needed extra volume of LOCA.

Figure 3:
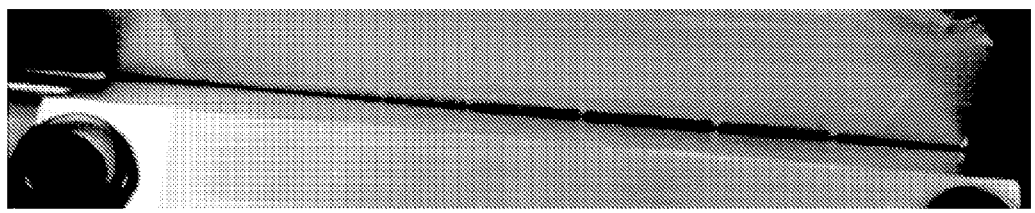
FIG. 3 is a photograph of a substrate with a recently coated patch of liquid thereon, showing an instance where the coating bead is being broken at the trailing end of the patch relatively quickly.

Referring now to FIG. 3, a photograph of a substrate with a recently coated patch thereon is illustrated. In this run, the slot die is being raised from the substrate at the trailing edge of the patch relatively quickly, such that coating bead is breaking a several different places along the cross direction. In this configuration the small breaks are too small to be undesirable in many applications.

Figure 4:
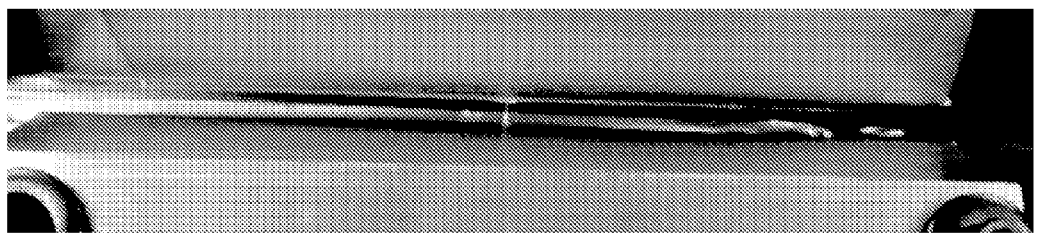
FIG. 4 is a photograph of a substrate with a recently coated patch of liquid thereon, showing an instance where the coating bead is being broken at the trailing end of the patch relatively slowly.

Referring now to FIG. 4, a photograph of a substrate with a recently coated patch thereon is illustrated. Compared to the situation depicted in FIG. 3, the slot die is being raised from the substrate at the trailing edge of the patch relatively slowly, such that coating bead is breaking at a single point in the center of the trailing edge. Surprisingly, considering the configuration shown in FIG. 3, both a relatively quick and a relatively slow retraction of the slot die produce the best margins. Intermediate retraction rates between these two desirable regimes produce less desirable trailing edges.

Figure 5:
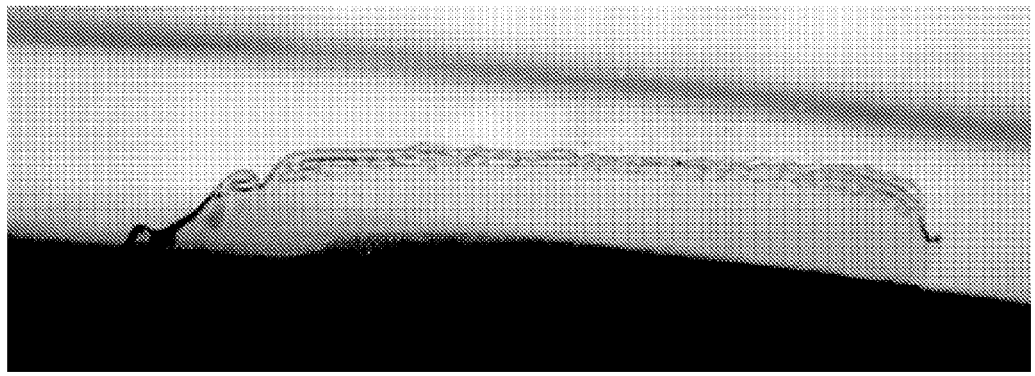
FIG. 5 is a photograph of a substrate with a recently coated patch of liquid thereon having, undesirable margin on the leading edge due to compressibility in the liquid delivery system.

Referring now to FIG. 5, a photograph of a substrate with a recently coated patch thereon having undesirable margin on the leading edge is presented. A margin like this has been found to result from due to compressibility in the fluid system.

Figure 6:
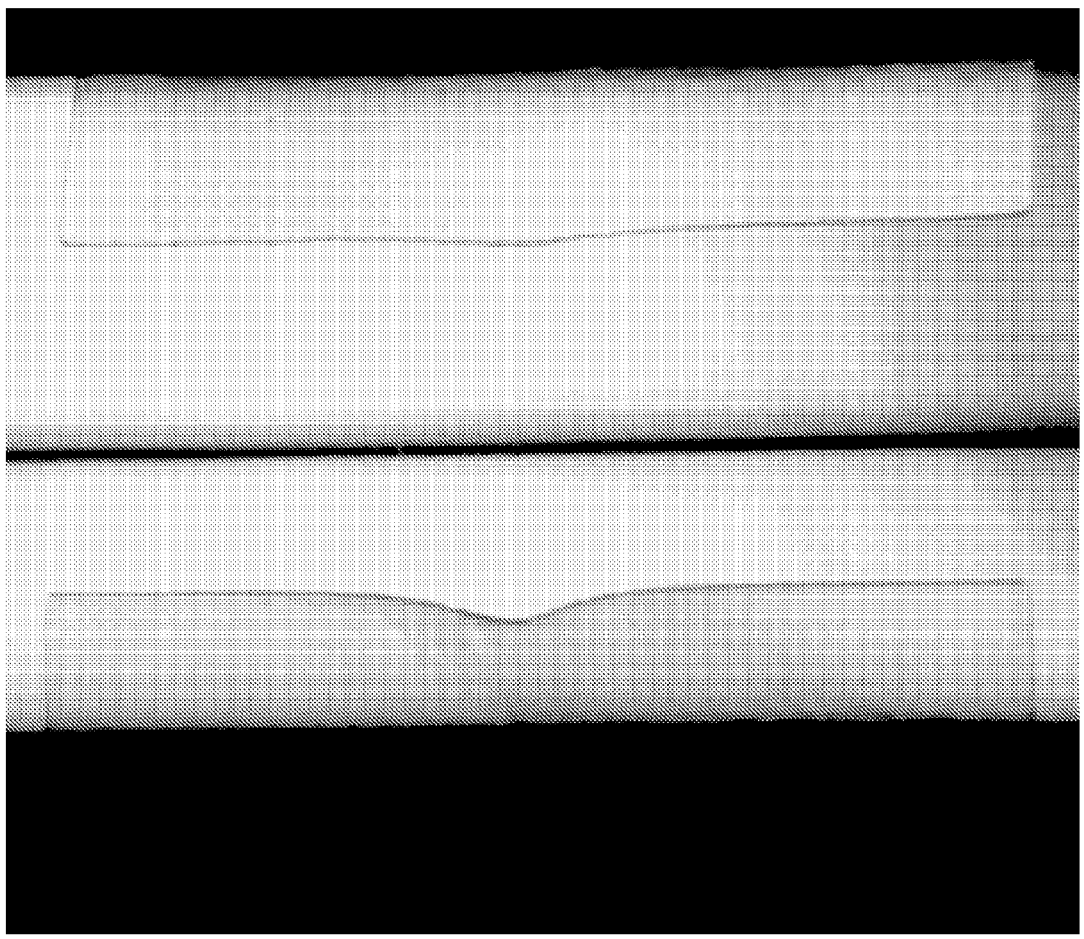
FIG. 6 is a photograph of a substrate with a recently coated patch of liquid thereon, having undesirable margin on the leading edge of one patch and the trailing edge of an adjacent patch due to a bubble in the die cavity.

Referring now to FIG. 6, a photograph of a substrate with a recently coated patch thereon having undesirable margin on the leading edge of one patch and the trailing edge of an adjacent patch is presented. A margin with this type of irregularity has typically been found to be due to a bubble in the die cavity.

In any of the foregoing exemplary embodiments, the patch may cover only a portion of a first major surface of the substrate. In some exemplary embodiments, the perimeter exhibits a geometric shape selected from a square, a rectangle, or a parallelogram. In certain exemplary embodiments, the predetermined position is selected such that the perimeter of the patch has a center proximate a center of the major surface of the substrate.

In further exemplary embodiments of any of the foregoing, the thickness of the patch is non-uniform. In some such embodiments, the thickness of the patch is greater proximate the center of the patch, and the thickness of the patch is lower proximate the perimeter of the patch. In certain embodiments, the patch includes at least one raised discrete protrusion extending outwardly from the major surface of the substrate. In further such exemplary embodiments, the at least one raised discrete protrusion is comprised of at least one raised rib extending across at least a portion of the major surface of the substrate. In some such embodiments, the at least one raised rib includes at least two raised ribs arranged cross-wise on the major surface of the substrate. In certain such embodiments, the at least two ribs intersect and overlap proximate the center of the perimeter of the patch.

In other exemplary embodiments, the at least one raised discrete protrusion is a multiplicity of raised discrete protrusions. In some such exemplary embodiments, the multiplicity of raised discrete protrusions is selected from a plurality of raised discrete bumps, a multiplicity of raised discrete ribs, or a combination thereof. In certain such embodiments, the multiplicity of raised discrete bumps is comprised of hemispherically-shaped bumps. Optionally, the multiplicity of raised discrete bumps is arranged in an array pattern. In some particular embodiments, the multiplicity of raised discrete ribs form a dogbone-shaped pattern. $sec^{-1}$ In other exemplary embodiments, the multiplicity of raised discrete ribs is comprised of elliptically-shaped ribs. In some such embodiments, the multiplicity of raised discrete ribs is arranged such that each rib is arranged substantially parallel to each adjoining rib. In certain such embodiments, at least two of the multiplicity of raised discrete ribs are arranged substantially parallel to each other, and at least one of the multiplicity of raised discrete ribs is arranged substantially orthogonal to the at least two substantially parallel raised discrete ribs.

In alternative exemplary embodiments to those described in the preceding two paragraphs, the thickness of the patch is substantially uniform. Optionally, a mean thickness of the patch is from about 1 μm to about 500 μm. In some such exemplary embodiments, the thickness of the patch has a uniformity of +/−10% of the mean thickness or better.

In further exemplary embodiments of any of the foregoing, the perimeter of the patch is defined by a plurality of lateral edges of the patch. In some such embodiments, at least one lateral edge of the patch is positioned relative to an edge of the substrate to within +/−500 μm of a target position.

Exemplary Lamination Processes

The operation of exemplary embodiments of the present disclosure will be further described with regard to the following non-limiting detailed Examples. These examples are offered to further illustrate the various specific and preferred embodiments and techniques. It should be understood, however, that many variations and modifications may be made while remaining within the scope of the present disclosure.

In further exemplary embodiments of any of the foregoing coating processes, the process includes a lamination step including disposing a second substrate relative to the first substrate such that the patch is positioned between the first and second substrates, wherein the patch contacts at least a portion of each of the first and second substrates, thereby forming a laminate. The lamination process may be advantageously used to make optical assemblies such as display panels.

Optical materials may be used to fill gaps between optical components or substrates of optical assemblies. Optical assemblies comprising a display panel bonded to an optical substrate may benefit if the gap between the two is filled with an optical material that matches or nearly matches the refractive indices of the panel and the substrate. For example, sunlight and ambient light reflection inherent between a display panel and an outer cover sheet may be reduced. Color gamut and contrast of the display panel can be improved under ambient conditions. Optical assemblies having a filled gap can also exhibit improved shock-resistance compared to the same assemblies having an air gap.

Optical materials used to fill gaps between optical components or substrates typically comprise adhesives and various types of cured polymeric compositions. However, these optical materials are not useful for making an optical assembly if, at a later time, one wishes to disassemble or rework the assembly with little or no damage to the components. This reworkability feature is needed for optical assemblies because the components tend to be fragile and expensive. For example, a cover sheet often needs to be removed from a display panel if flaws are observed during or after assembly or if the cover sheet is damaged after sale. It is desirable to rework the assembly by removing the cover sheet from the display panel with little or no damage to the components. Reworkability is becoming increasingly important as the size or area of available display panels continues to increase.

Optical Assemblies

An optical assembly having a large size or area can be difficult to manufacture, especially if efficiency and stringent optical quality are desired. A gap between optical components may be filled by pouring or injecting a curable composition into the gap followed by curing the composition to bond the components together. However, these commonly used compositions have long flow-out times which contribute to inefficient manufacturing methods for large optical assemblies.

The optical assembly disclosed herein comprises an adhesive layer and optical components, particularly a display panel and a substantially light transmissive substrate. The adhesive layer allows one to rework the assembly with little or no damage to the components. Optionally, the adhesive layer may have a cleavage strength between glass substrates of about 15 N/mm or less, 10 N/mm or less, or 6 N/mm or less, such that reworkability can be obtained with little or no damage to the components. Total energy to cleavage can be less than about 25 kg-mm over a 1 by 1 inch (2.54 by 2.54 cm) area.

Substantially Transparent Substrates

The substantially transparent substrate used in the optical assembly may comprise a variety of types and materials. The substantially transparent substrate is suitable for optical applications and typically has at least 85% transmission of visible light over the range of from 460 to 720 nm. The substantially transparent substrate may have, per millimeter thickness, a transmission of greater than about 85% at 460 nm, greater than about 90% at 530 nm, and greater than about 90% at 670 nm.

The substantially transparent substrate may comprise glass or polymer. Useful glasses include borosilicate, soda lime, and other glasses suitable for use in display applications as protective covers. One particular glass that may be used comprises EAGLE XG and JADE glass substrates available from Corning Inc. Useful polymers include polyester films such as polyethylene terephalate, polycarbonate films or plates, acrylic films such as polymethylmethacrylate films, and cycloolefin polymer films such as ZEONOX and ZEONOR available from Zeon Chemicals L.P. The substantially transparent substrate preferably has an index of refraction close to that of display panel and/or the adhesive layer; for example, from about 1.4 and about 1.7. The substantially transparent substrate typically has a thickness of from about 0.5 to about 5 mm.

The substantially transparent substrate may comprise a touch screen. Touch screens are well known and generally comprise a transparent conductive layer disposed between two substantially transparent substrates. For example, a touch screen may comprise indium tin oxide disposed between a glass substrate and a polymer substrate.

Adhesive Layers

The adhesive layer is preferably suitable for optical applications. For example, the adhesive layer may have at least 85% transmission over the range of from 460 to 720 nm. The adhesive layer may have, per millimeter thickness, a transmission of greater than about 85% at 460 nm, greater than about 90% at 530 nm, and greater than about 90% at 670 nm. These transmission characteristics provide for uniform transmission of light across the visible region of the electromagnetic spectrum which is important to maintain the color point in full color displays.

The color portion of the transparency characteristics of the adhesive layer is further defined by its color coordinates as represented by the CIE L*a*b* convention. For example, the b* component of color should be less than about 1, more preferably less than about 0.5. These characteristics of b* provide for a low yellowness index which is important to maintain the color point in full color displays.

The haze portion of the transparency characteristics of the adhesive layer is further defined by the % haze value of the adhesive layer as measured by haze meters such as a HazeGard Plus available from Byk Gardner or an UltraScan Pro available from Hunter Labs. The optically clear article preferably has haze of the of less than about 5%, preferably less than about 2%, most preferably less than about 1%. These haze characteristics provide for low light scattering which is important to maintain the quality of the output in full color displays.

For reasons described above, the adhesive layer preferably has a refractive index that matches or closely matches that of the display panel and/or the substantially transparent substrate. The refractive index of the adhesive can be controlled by the proper choice of adhesive components. For example, the refractive index can be increased by incorporating oligomers, diluting monomers and the like which contain a higher content of aromatic structure or incorporate sulfur or halogens such as bromine. Conversely the refractive index can be adjusted to lower values by incorporating oligomer, diluting monomers and the like that contain a higher content of aliphatic structure. For example, the adhesive layer may have a refractive index of from about 1.4 to about 1.7.

The adhesive may remain transparent by the proper choice of adhesive components including oligomers, diluting monomers, fillers, plasticizers, tackifying resins, photoinitiators and any other component which contributes to the overall properties of the adhesive. In particular, the adhesive components should be compatible with each other, for example they should not phase separate before or after cure to the point where domain size and refractive index differences cause light scattering and haze to develop, unless haze is a desired outcome, such as for diffuse adhesive applications. In addition the adhesive components should be free of particles that do not dissolve in the adhesive formulation and are large enough to scatter light, and thereby contribute to haze. If haze is desired, such as in diffuse adhesive applications, this may be acceptable. In addition, various fillers such as thixotropic materials should be so well dispersed that they do not contribute to phase separation or light scattering which can contribute to a loss of light transmission and an increase in haze. Again, if haze is desired, such as in diffuse adhesive applications, this may be acceptable. These adhesive components also should not degrade the color characteristics of transparency by, for example, imparting color or increasing the b* or yellowness index of the adhesive layer.

The adhesive layer (i.e. the patch of the first coating liquid or LOCA coated on the substrate) can be used in an optical assembly including a display panel, a substantially transparent substrate, and the adhesive layer disposed between the display panel and the substantially transparent substrate.

The adhesive layer may have any thickness. The particular thickness employed in the optical assembly may be determined by any number of factors, for example, the design of the optical device in which the optical assembly is used may require a certain gap between the display panel and the substantially transparent substrate. The adhesive layer typically has a thickness of from about 1 μm to about 5 mm, from about 50 μm to about 1 mm, or from about 50 μm to about 0.2 mm.

The optical assembly may be prepared using an assembly fixture such as the one described in U.S. Pat. No. 5,867,241. In this method, a fixture comprising a flat plate with pins pressed into the flat plate is provided. The pins are positioned in a predetermined configuration to produce a pin field which corresponds to the dimensions of the display panel and of the component to be attached to the display panel. The pins are arranged such that when the display panel and the other components are lowered down into the pin field, each of the four corners of the display panel and other components is held in place by the pins. The fixture aids assembly and alignment of the components of an optical assembly with suitable control of alignment tolerances. Additional embodiments of this assembly method are described in U.S. Pat. No. 6,388,724 B1, describes how standoffs, shims, and/or spacers may be used to hold components at a fixed distance to each other.

Curing

In some embodiments, the process further includes curing the coating liquid by applying heat, actinic radiation, ionizing radiation, or a combination thereof.

Any form of electromagnetic radiation may be used, for example, the liquid compositions may be cured using UV-radiation and/or heat. Electron beam radiation may also be used. The liquid compositions described above are said to be cured using actinic radiation, i.e., radiation that leads to the production of photochemical activity. For example, actinic radiation may comprise radiation of from about 250 to about 700 nm. Sources of actinic radiation include tungsten halogen lamps, xenon and mercury arc lamps, incandescent lamps, germicidal lamps, fluorescent lamps, lasers and light emitting diodes. UV-radiation can be supplied using a high intensity continuously emitting system such as those available from Fusion UV Systems.

In some embodiments, actinic radiation may be applied to a layer of the liquid composition such that the composition is partially polymerized. The liquid composition may be disposed between the display panel and the substantially transparent substrate and then partially polymerized. The liquid composition may be disposed on the display panel or the substantially transparent substrate and partially polymerized, then the other of the display panel and the substrate may be disposed on the partially polymerized layer.

In some embodiments, actinic radiation may be applied to all or a portion of a layer of the liquid composition such that the composition is completely or nearly completely polymerized in at least the irradiated region. The liquid composition may be disposed between the display panel and the substantially transparent substrate and then completely or nearly completely polymerized. The liquid composition may be disposed on the display panel or the substantially transparent substrate and completely or nearly completely polymerized, than the other of the display panel and the substrate may be disposed on the polymerized layer.

In the assembly process, it is generally desirable to have a layer of the liquid composition that is substantially uniform. Radiation may then be applied to form the adhesive layer.

Display Panels

In some particular exemplary embodiments, the laminate is comprised of a display panel selected from an organic light-emitting diode display, an organic light-emitting transistor display, a liquid crystal display, a plasma display, a surface-conduction electron-emitter display, a field emission display, a quantum dot display, a liquid crystal display, a micro-electromechanical system display, a ferro liquid display, a thick-film dielectric electroluminescent display, a telescopic pixel display, or a laser phosphor display.

The display panel may comprise any type of panel such as a liquid crystal display panel. Liquid crystal display panels are well known and typically comprise a liquid crystal material disposed between two substantially transparent substrates such as glass or polymer substrates. As used herein, substantially transparent refers to a substrate that is suitable for optical applications, e.g., has at least 85% transmission over the range of from 460 to 720 nm. Optical substrates may have, per millimeter thickness, a transmission of greater than about 85% at 460 nm, greater than about 90% at 530 nm, and greater than about 90% at 670 nm. On the inner surfaces of the substantially transparent substrates are transparent electrically conductive materials that function as electrodes. In some cases, on the outer surfaces of the substantially transparent substrates are polarizing films that pass essentially only one polarization state of light. When a voltage is applied selectively across the electrodes, the liquid crystal material reorients to modify the polarization state of light, such that an image is created. The liquid crystal display panel may also comprise a liquid crystal material disposed between a thin film transistor array panel having a plurality of thin film transistors arranged in a matrix pattern and a common electrode panel having a common electrode.

The display panel may comprise a plasma display panel. Plasma display panels are well known and typically comprise an inert mixture of noble gases such as neon and xenon disposed in tiny cells located between two glass panels. Control circuitry charges electrodes within the panel which causes the gases to ionize and form a plasma, which then excites phosphors to emit light.

The display panel may comprise an organic electroluminescence panel. These panels are essentially a layer of an organic material disposed between two glass panels. The organic material may comprise an organic light emitting diode (OLED) or a polymer light emitting diode (PLED). These panels are well known.

The display panel may comprise an electrophoretic display. Electrophoretic displays are well known and are typically used in display technology referred to as electronic paper or e-paper. Electrophoretic displays comprise a liquid charged material disposed between two transparent electrode panels. Liquid charged material may comprise nanoparticles, dyes and charge agents suspended in a nonpolar hydrocarbon, or microcapsules filled with electrically charged particles suspended in a hydrocarbon material. The microcapsules may also be suspended in a layer of liquid polymer.

The optical assemblies and/or display panels disclosed herein may be used in a variety of optical devices including, but not limited to, a handheld device such as a phone, a television, a computer monitor, a projector, a sign. The optical device may comprise a backlight.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

All parts, percentages, ratios, and the like in the Examples and the rest of the specification are by weight, unless noted otherwise. Solvents and other reagents used may be obtained from Sigma-Aldrich Chemical Company (Milwaukee, Wis.) unless otherwise noted.

Test Methods

Viscosity Measurement

Viscosity measurements were made by using an AR2000 Rheometer equipped with a 40 mm, 1° stainless steel cone and plate from TA Instruments, New Castle, Del. Viscosities were measured at 25° C. using a steady state flow procedure at several shear rates from 0.01 to 100 $sec^{-1}$ with a 28 µm gap between cone and plate.

Experimental Apparatus

A first coating apparatus was constructed as generally depicted in FIG. 1. A substrate support 52 was mounted on precision sliding bearings commercially available as model SHS-15 from THK Co. (Tokyo, JP), and was moved by an actuator commercially available as model ICD10-100A1 linear motor from Kollmorgen (Radford, Va.), provided with a drive/amplifier commercially available as model AKD-P00306-NAEC-0000, also from Kollmorgen. Mounted above the substrate support was a coating head in the form of a slot die having a cavity and being of conventional type, 4 inches (102 mm) wide. The coating head was mounted on a linear actuator commercially available as model ICD 10-100 from Kollmorgen. An encoder integral to the linear actuator was used to monitor the die gap between the slot from the surface of the substrate in cooperation with a physical standard (a precision shim). It is contemplated that other position sensors, such as laser triangulation sensors, could be additionally employed, especially when the flatness of the substrate is an issue. It has been found in practice that the actuator, sensor, physical geometry of the components and the stiffness of the mechanical system all play a role in the ability to achieve both a high dimensional accuracy of the patch and the cleanness of the leading and trailing edges.

A 100 ml stainless steel syringe 90, commercially available as model 702261 from Harvard Precision Instruments, Inc. (Holliston, Mass.), was used to dispense fluid into fluid line 92. The actuator 96 was as model ICD10-100A1 linear motor from Kollmorgen, provided with a drive/amplifier commercially available as model AKD-P00306-NAEC-0000, also from Kollmorgen. The sensor 98 was a read head commercially available as RGH20 L-9517-9125 with a 20 micron tape scale from Renishaw, Inc. (Hoffman Estates, Ill.). The several pressure transducers described above were commercially available as 280E (100 psig range; 689 kPa) from Setra Systems, Inc. (Boxborough, Mass.). Controller 60 was available as CX1030, equipped with a point to point motion profile, from Beckhoff Automation LLC (Burnsville, Minn.).

In the several Examples below, motion profiles executed by the controller were used in two manners to achieve precise patch coating. The first manner was to use position profiles to determine the final shape of the patch that is applied. The profiles were initially created by using volumetric calculations and physical models to determine the approximate material flow rate and position at each instant of time. The integral of the flow rate, over the die position relative to the substrates, determines the coated surface's profile. In addition, a profile is entered for positioning the die relative to the surface, as well as the substrate position and velocity relative to the die.

Next, multiple coatings were applied, and the actual achieved profile was measured. Because of higher order physical affects, there were some differences between the predicted edge start position, ending position, and profile and the actual outcome. By iteratively adjusting the motion profile, these differences from the desired profile were attenuated or eliminated. For example, if the patch starting edge is 100 microns late (perhaps because the instant model had some errors from the actual model of the geometry of the pump, die and delivery system, including fluid dynamics), the starting profile may be advanced by a velocity integrated over time to equal to 100 microns. Similarly, if the starting edge is not sharp enough, an initial step can be introduced to provide additional fluid at the start, increasing edge sharpness.

The second manner in which the profiles were used was to manage the position, velocity, acceleration, and jerk rate (or more specifically the position vs. time equation and its first three derivatives). As a for example, one might suppose that a good leading or trailing edge could be achieved simply by asking the apparatus to provide as close to an infinitely sharp step as possible. However, experience has shown that several problems occur. One is if the actual profile is not within the controllers capability (due to physical constraints), then differences from the planned path and the actual path occur. This resulted in coated profile error.

The second aspect is that when high forces are applied to the mechanics, mechanical deflections of the position of the die and pump occur. This causes additional errors. In addition, these defections store energy, which result in a "ringing" of the mechanical components, this causes applied profile errors long after the initial impulse has occurred. By limiting the derivatives to achievable values, and blending motion segments by keeping the derivatives as continuous as possible across segment boundaries, much higher accuracy was achieved. While motion profiles per se are known in precision motion control, the use of higher derivations is not presently done in connection with precision coating. In addition, no motion profile segments are known in the context of compensating for an undesired coated surface profile.

Further, exemplary embodiments of the present disclosure also coordinate the motion of the substrate relative to the die to further enhance the accuracy of the coated patch. For example, suppose it is desirable to approximate an infinitely sharp start of the application of the coating liquid to the substrate (e.g. the thickness of the patch goes from a thickness of 0 microns to a thickness of 300 microns over a relative movement of the die slot and the substrate of zero microns. However, we can dramatically improve upon the positional accuracy by coordinating the profile of the die, pump, and substrate.

Thus, instead of high acceleration motions, we can slowly ramp up all three profiles, so the initial contact of the coating bead to the substrate is at a very slow velocity (near or potentially zero). Then we can ramp up the substrate position in lock step with the pump to deliver an extremely sharp edge. Note also that since high accelerations are not introduced into the system, the profile may be positioned on the substrate with high accuracy.

Example 1

An alternate apparatus was also built, generally similar to the apparatus depicted in FIG. 1, and discussed above, except that the support for the substrate was cylindrical and was put into rotary motion in order to create relative motion between the coating head and the substrate. More specifically, the support was an aluminum drum, 32.4 cm in diameter, whose rotational motion was controlled by a motor, commercially available as model FH5732 from Kollmorgen, coupled to the drum by air bearings commercially available as BLOCK-HEAD 10R from Professional Instruments of Hopkins, Minn.

The drum was cleaned with isopropyl alcohol and allowed to dry. Several sheets of 0.1 mm thick by 300 mm long by 150 mm wide flexible glass commercially available as OA10G from Nippon Electric Glass America, Inc of Schaumburg, Ill. were adhered to the drum. A pseudoplastic and thixotropic liquid optically clear adhesive, commercially available as 1033 STENCIL PRINTABLE OPTICALLY CLEAR ADHESIVE from 3M Company of St. Paul, Minn. was prepared. This LOCA was tested for viscosity according to the test method above and found to be 702 Pa-sec at a shear rate of 0.01 $sec^{-1}$, 182.8 Pa-sec at a shear rate of 0.1 $sec^{-1}$, 39.5 Pa-sec at a shear rate of 1 $sec^{-1}$, 15.6 Pa-sec at a shear rate of 10 $sec^{-1}$, and 10.1 Pa-sec at a shear rate of 100 $sec^{-1}$.

The LOCA was fed into the empty syringe from the remote reservoir using a pressure of 80 psi (552 kPa). During filling, a vent at the top of the plunger body was open, enabling trapped air escape. This vent was closed once bubble-free resin was flowing from it. The filling continued until bubble-free resin was flowing from the die slot, then a valve between the coating system (syringe and die) and the remote reservoir was closed. The gap between the die slot and the aluminum drum was verified and the die slot was positioned at its starting gap using a precision shim. The syringe pump fed into a coating head in the form of a slot die having a 4 inch (10.2 cm) wide by 0.020 inch (0.51 mm) high slot with a 0.001 inch (0.025 mm) overbite.

The controller was programmed to simultaneously control the various actuators in terms of several distinct time segments of not necessarily equal length. These parameters are summarized in Table 1. Of course, the ordinary artisan will perceive that the programming could be performed in terms of any of several other convenient parameters, such as the distance of longitudinal travel of the substrate. This last might be particularly convenient in terms of a web of indefinite length, particularly a web of indefinite length having fiducial marks as illustrated in FIG. 2B.

Eight patches were coated, two per glass sheet, around the circumference of the aluminum drum with small gaps in-between each patch and the next. A position and thickness sensor, commercially available as model LT-9010 M, from Keyence America of Itasca, Ill. was scanned across the coated patches to verify thickness uniformity.

TABLE 1

| Time Segment (arbitrary units) | Duration of the Segment (sec) | Cumulative Time at End of Segment (sec) | Translation Speed of Substrate (rpm) | Distance From Slot to Substrate (mm) | Velocity of Movement of the Slot Die to the Specified Distance (mm/sec) | Velocity of Movement of the Syringe Plunger (mm/sec) |
|---|---|---|---|---|---|---|
| 0 | 0.223 | 0.223 | 1.498 | 3.00 | 15 | 0.000 |
| 1 | 0.138 | 0.360 | 1.498 | 0.200 | 15 | 3.000 |
| 2 | 3.867 | 4.228 | 1.498 | 0.200 | 15 | 0.548 |
| 3 | 0.170 | 4.398 | 1.498 | 0.200 | 15 | −3.000 |
| 4 | 10.000* | 5.398 | 0.0912 | 3.00 | 15 | 0.000 |

*This segment is provided to space one patch from an adjacent patch around the drum.

Example 2

The set-up for this Example is generally similar to that of Example 1, except for the programming provided to the controller. Table 2 summarizes this Example.

TABLE 2

| Time Segment (arbitrary units) | Duration of the Segment (sec) | Cumulative Time at End of Segment (sec) | Translation Speed of Substrate (rpm) | Distance From Slot to Substrate (mm) | Velocity of Movement of the Slot Die to the Specified Distance (mm/sec) | Velocity of Movement of the Syringe Plunger (mm/sec) |
|---|---|---|---|---|---|---|
| 0 | 0.223 | 0.223 | 1.498 | 3.00 | 15 | 0.000 |
| 1 | 0.165 | 0.388 | 1.498 | 0.200 | 15 | 2.000 |
| 2 | 3.840 | 4.228 | 1.498 | 0.200 | 15 | 0.548 |
| 3 | 0.204 | 4.432 | 1.498 | 0.200 | 15 | −2.000 |
| 4 | 10.000* | 14.432 | 0.086 | 3.00 | 15 | 0.000 |

*This segment is provided to space one patch from an adjacent patch around the drum.

Example 3

The sample according to Example 1 was carefully removed from the drum and placed on a granite table. A similarly sized sheet of EAGLE XG display glass, commercially available for Corning, of Corning N.Y., was manually laminated using motion normal to the surface of the granite and in normal atmosphere. A slight curvature was forced of the display glass during lamination to reduce the resulting pockets of trapped gas during lamination. The resulting sample showed pockets of trapped gas, though it is anticipated that lamination in vacuum or lamination with machine manipulation of the display glass would produce better results.

Example 4

The procedure of Example 1 is repeated, except that the flow parameters are modified to produce the patch illustrated in FIGS. 2C and 2D. A lamination of display glass generally as described in Example 3 is performed. A lamination without trapped gas bubbles is observed.

Example 5

The sample according to Example 1 is carefully removed from the drum and placed on a granite table. A wire wound rod commercially available as a #75 Mayer Rod, from R.D. Specialties of Webster, N.Y., is manually pulled over the coating to create a ribbed structure with the ribs' long axis parallel to the direction of subsequent lamination. A similarly sized sheet of EAGLE XG display glass is laminated using motion normal to the surface of the granite and in normal atmosphere.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this present disclosure is not to be unduly limited to the illustrative embodiments set forth hereinabove. Furthermore, all publications, published patent applications and issued patents referenced in the Detailed Description are incorporated herein by reference in their entirety to the same extent as if each individual publication or patent was specifically and individually indicated to be incorporated by reference. Various exemplary embodiments have been described. These and other embodiments are within the scope of the following claims.

The invention claimed is:

1. A process, comprising:
providing a coating head, the coating head comprising an external opening in flow communication with a source of a first coating liquid;
positioning the coating head relative to a substrate to define a gap between the external opening and the substrate;
creating relative motion between the coating head and the substrate in a coating direction; and
dispensing a pre-determined quantity of the first coating liquid from the external opening onto at least a portion of at least one major surface of the substrate to form a discrete patch of the first coating liquid in a predetermined position on at least a portion of the major surface of the substrate, the patch having a thickness and a perimeter, wherein the first coating liquid as dispensed exhibits a viscosity of at least 1 Pascal-sec,
optionally wherein a stencil is not used to form the discrete patch.

2. The process of claim 1, wherein the first coating liquid is dispensed at a shear rate of at least about 1 sec$^{-1}$, optionally wherein the first coating liquid is dispensed at a shear rate no greater than about 100,000 sec$^{-1}$.

3. The process of claim 1, wherein the first coating liquid is dispensed at a temperature from about 20° C. to about 100° C.

4. The process of claim 1, wherein the first coating liquid as dispensed exhibits a viscosity from about 2 Pascal-sec to about 20 Pascal-sec.

5. The process of claim 1, wherein the first coating liquid exhibits at least one rheological characteristic selected from the group consisting of thixotropic rheological behavior and pseudoplastic rheological behavior.

6. The process of claim 1, wherein the first coating liquid is a liquid optically clear adhesive composition.

7. The process of claim 1, wherein the patch covers only a portion of a first major surface of the substrate.

8. The process of claim 1, wherein the perimeter exhibits a geometric shape selected from a square, a rectangle, or a parallelogram.

9. The process of claim 1, wherein the thickness of the patch is greater proximate a center of the patch, further wherein the thickness of the patch is lower proximate the perimeter of the patch.

10. The process of claim 1 wherein the patch is comprised of at least one raised discrete protrusion extending outwardly from the major surface of the substrate.

11. The process of claim 1, wherein the thickness of the patch is substantially uniform, optionally wherein a mean thickness of the patch is from about 1 μm to about 500 μm.

12. The process of claim 1, wherein the substrate is a light emitting display component or a light reflecting device component.

13. The process of claim 1, wherein the coating head is selected from the group consisting of a single slot die, a multiple slot die, a single orifice die, and a multiple orifice die.

14. The process of claim 13, wherein the coating head is a single slot die having a single die slot, further wherein the external opening is comprised of the die slot.

15. The process of claim 14, wherein the geometry of the single slot die is selected from a sharp-lipped extrusion slot die, a slot fed knife die with a land, or a notched slot die.

16. The process of claim 1, further comprising repeating the steps of claim 1 using a second coating liquid.

17. The process of claim 1, further comprising disposing a second substrate relative to the first substrate such that the patch is positioned between the first and second substrates, wherein the patch contacts at least a portion of each of the first and second substrates, thereby forming a laminate.

18. The process of claim 17, further comprising curing the coating liquid by applying heat, actinic radiation, ionizing radiation, or a combination thereof.

19. The process of claim 18, wherein the laminate comprises an organic light-emitting diode display, an organic light-emitting transistor display, a liquid crystal display, a plasma display, a surface-conduction electron-emitter display, a field emission display, a quantum dot display, a liquid crystal display, a micro-electromechanical system display, a ferro liquid display, a thick-film dielectric electroluminescent display, a telescopic pixel display, or a laser phosphor display.

* * * * *

UNITED STATES PATENT AND TRADEMARK OFFICE
CERTIFICATE OF CORRECTION

PATENT NO. : 9,738,816 B2
APPLICATION NO. : 14/442131
DATED : August 22, 2017
INVENTOR(S) : Jonathan O'Hare et al.

Page 1 of 1

It is certified that error appears in the above-identified patent and that said Letters Patent is hereby corrected as shown below:

In the Specification

Column 3
Lines 3-4, delete "(meth)acryolyl" and insert -- (meth)acryloyl --, therefor.

Column 5
Line 61, after "substrate" insert -- . --.

Column 13
Line 9, delete "(meth)acryolyl" and insert -- (meth)acryloyl --, therefor.
Line 28, after "2012" insert -- under Attorney Docket No. 69825US002 --.

Column 14
Line 37, delete "Industries," and insert -- Industries. --, therefor.

Column 20
Line 17, delete "24'" and insert -- 24''' --, therefor.

Column 21
Lines 30-31, delete "sec$^{-1}$", therefor.

Column 23
Line 1, delete "terephalate," and insert -- terephthalate, --, therefor.
Line 39, delete "has haze of the of less than about 5%," and insert -- has haze of less than about 5%, --, therefor.

In the Claims

Column 32
Line 8, (approx.), in Claim 10, after "claim 1" insert -- , --.

Signed and Sealed this
Twenty-fourth Day of April, 2018

Andrei Iancu
*Director of the United States Patent and Trademark Office*